(12) United States Patent
Feng et al.

(10) Patent No.: US 10,327,234 B2
(45) Date of Patent: Jun. 18, 2019

(54) BLIND DECODING OF (E)PDCCH FOR PARTIAL SUBFRAMES

(71) Applicant: Panasonic Intellectual Property Corporation of America, Torrance, CA (US)

(72) Inventors: Sujuan Feng, Frankfurt (DE); Michael Einhaus, Darmstadt (DE); Alexander Golitschek Edler von Elbwart, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/751,448

(22) PCT Filed: Aug. 5, 2016

(86) PCT No.: PCT/EP2016/068816
§ 371 (c)(1),
(2) Date: Feb. 8, 2018

(87) PCT Pub. No.: WO2017/025484
PCT Pub. Date: Feb. 16, 2017

(65) Prior Publication Data
US 2018/0242283 A1 Aug. 23, 2018

(30) Foreign Application Priority Data
Aug. 11, 2015 (EP) .................................. 15180638

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0053* (2013.01);
(Continued)

(58) Field of Classification Search
CPC ........................... H04L 5/0048; H04L 5/0053
See application file for complete search history.

(56) References Cited

U.S. PATENT DOCUMENTS

2014/0119349 A1* 5/2014 Takano ................. H04W 16/32
370/336
2014/0161084 A1* 6/2014 Yang .................... H04L 1/1822
370/329

(Continued)

OTHER PUBLICATIONS

3GPP TS 36.211 V12.6.0, "3rd Generation Partnership Project; Technical Specification Group Radio Access Network; Evolved Universal Terrestrial Radio Access (E-UTRA); Physical channels and modulation (Release 12)," Jun. 2015, 136 pages.

(Continued)

*Primary Examiner* — Shukri Taha
(74) *Attorney, Agent, or Firm* — Seed IP Law Group LLP

(57) ABSTRACT

The invention relates to a method for blind decoding control signal candidates, preconfigured by a base station for a user equipment in a control region of each subframe. A plurality of starting positions is preconfigured between two subsequent subframe boundaries. The subframe is either a partial subframe or a full subframe. A first set of control signal candidates is preconfigured for the UE for the first starting position, and further sets of control signal candidates are preconfigured for the remaining starting positions. The number of control signal candidates of at least one of the further sets is less than the number of control signal candidates of the first set. For each subframe, the UE, for at least the first starting position out of the plurality of starting positions, (Continued)

blind decodes the set of control signal candidates preconfigured for that starting position to receive the one or more control signals.

20 Claims, 13 Drawing Sheets

(51) Int. Cl.
  *H04L 27/00* (2006.01)
  *H04W 16/14* (2009.01)
  *H04W 74/08* (2009.01)
  *H04W 76/28* (2018.01)
(52) U.S. Cl.
  CPC ......... *H04L 27/0006* (2013.01); *H04W 16/14* (2013.01); *H04W 74/0808* (2013.01); *H04W 76/28* (2018.02)

(56) References Cited

U.S. PATENT DOCUMENTS

| | | | | |
|---|---|---|---|---|
| 2014/0177581 | A1* | 6/2014 | Zhang | H04L 1/0038 370/329 |
| 2015/0016370 | A1* | 1/2015 | Takeda | H04W 72/042 370/329 |
| 2016/0073386 | A1* | 3/2016 | Yang | H04L 5/0053 370/280 |
| 2017/0325115 | A1* | 11/2017 | Matsumoto | H04W 16/14 |
| 2018/0069653 | A1* | 3/2018 | Fujishiro | H04W 16/14 |

OTHER PUBLICATIONS

3GPP TS 36.213 V12.6.0, "3$^{rd}$ Generation Partnership Project; Technical Specification Group Radio Access Network; Evolved Universal Terrestrial Radio Access (E-UTRA); Physical layer procedures (Release 12)," Jun. 2015, 241 pages.

3GPP TR 36.889 V13.0.0, "3$^{rd}$ Generation Partnership Project; Technical Specification Group Radio Access Network; Study on Licensed-Assisted Access to Unlicensed Spectrum (Release 13)," Jun. 2015, 286 pages.

Alcatel-Lucent, Alcatel-Lucent Shanghai Bell, Coolpad, Ericsson, ETRI, Huawei, HiSilicon, IAESI, InterDigital, LG, Nokia Corporation, Nokia Networks, Qualcomm, NTT Docomo, Panasonic, Samsung, TI, Verizon Wireless, ZTE, "Regulatory Requirements for Unlicensed Spectrum," R1-144348 (R1-144226), 3GPP TSG RAN WG1 Meeting #78bis, Agenda Item: 7.3.2.1, Ljubljana, Slovenia, Oct. 6-10, 2014, 26 pages.

ETSI EN 301 893 V1.8.0, "Broadband Radio Access Networks (BRAN); 5 GHz high performance RLAN; Harmonized EN covering the essential requirements of article 3.2 of the R&TTE Directive," *Harmonized European Standard*, Jan. 2015, 93 pages.

Extended European Search Report, dated Jan. 29, 2016, for corresponding European Patent Application No. 15180638.7-1851, 8 pages.

Huawei, HiSilicon, "DL control channel for LAA," R1-152475, 3GPP TSG RAN WG1 Meeting #81, Agenda Item: 6.2.4.3, Fukuoka, Japan, May 25-29, 2015, 5 pages.

International Search Report, dated Oct. 12, 2016, for related International Patent Application No. PCT/EP2016/068816, 2 pages.

MediaTek Inc., "eNB and UE behaviors with respect to partial subframes," R1-153259, 3GPP TSG RAN WG1 meeting #81, Agenda Item: 6.2.4.3, Fukuoka, Japan, May 25-29, 2015, 3 pages.

Panasonic, "Indication of PDSCH in partial subframe," R1-152921, 3GPP TSG RAN WG1 Meeting #81, Agenda Item: 6.2.4.3, Fukuoka, Japan, May 25-29, 2015, 4 pages.

Samsung, "Discussion on (E)PDCCH/PDSCH transmission in partial subframe for LAA," RI-152871, 3GPP TSG RAN1 #81, Agenda Item: 6.2.4.3, Fukuoka, Japan, May 25-29, 2015, 4 pages.

\* cited by examiner

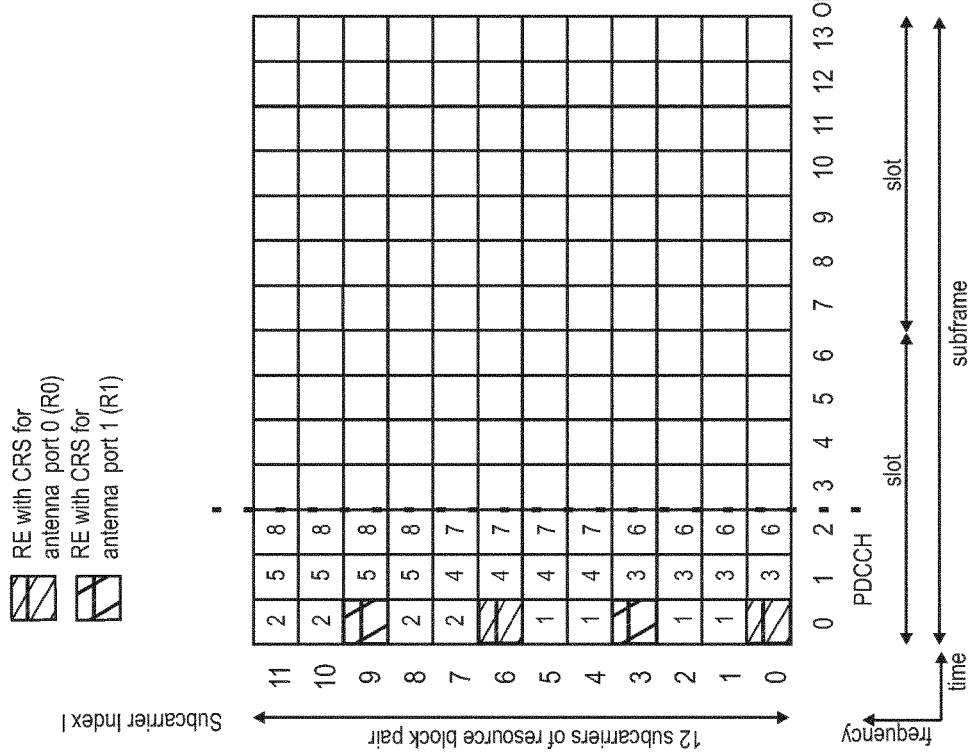

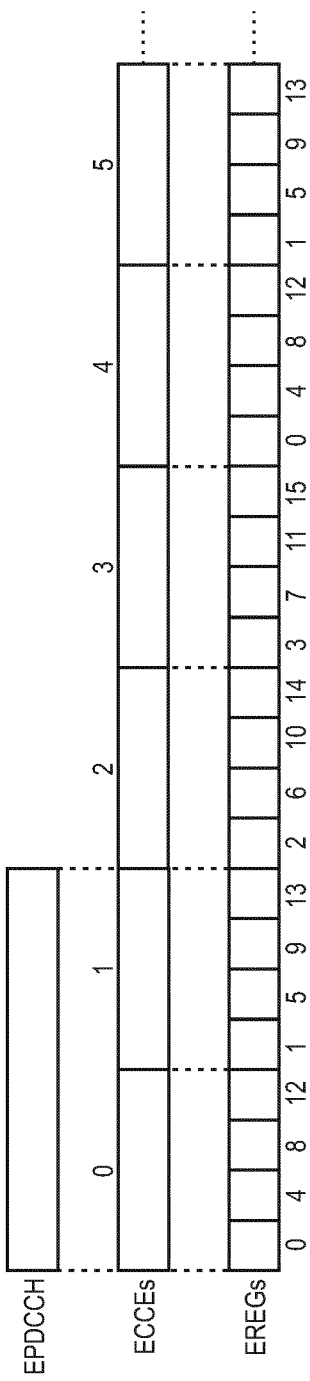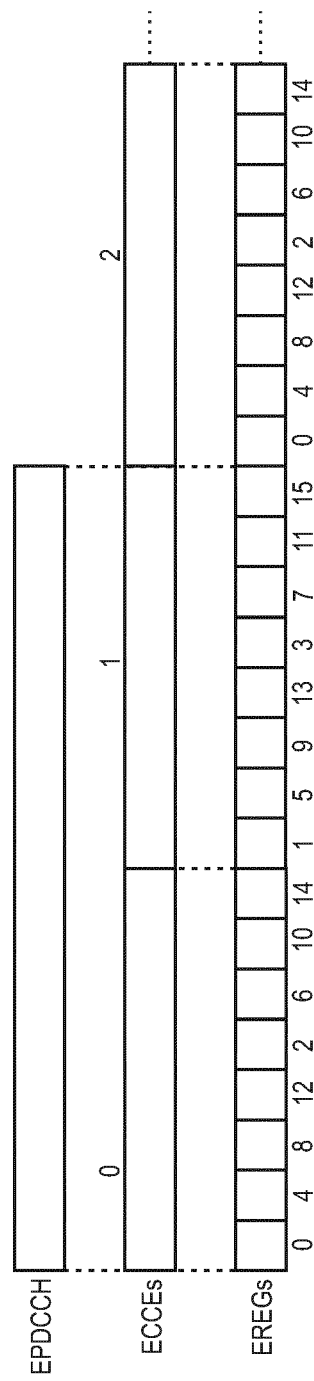

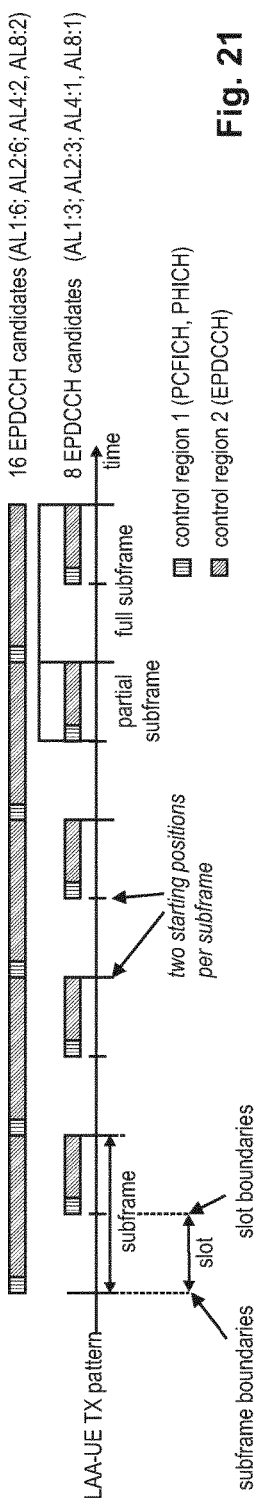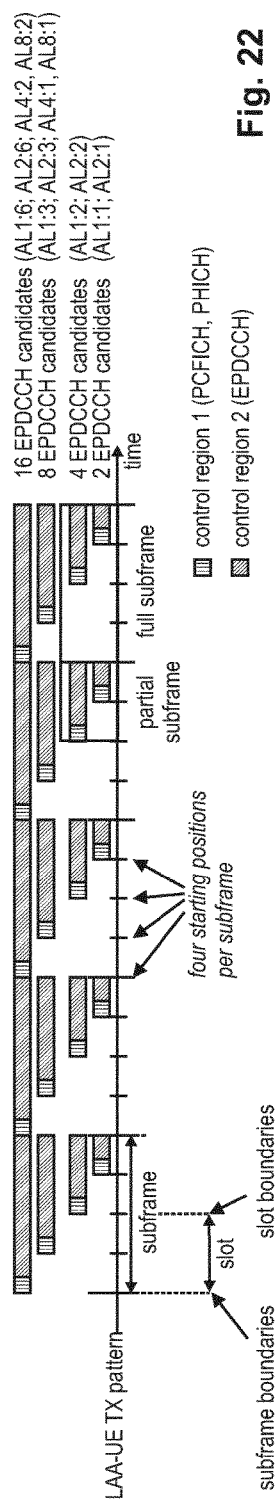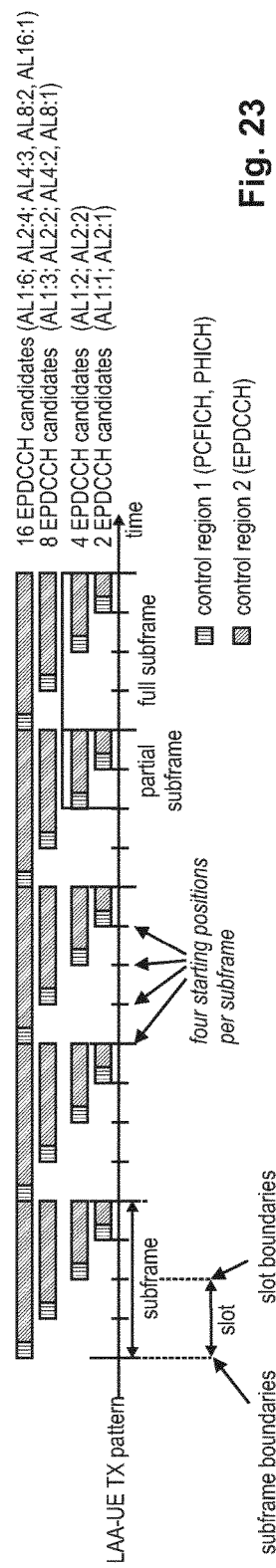
Fig. 21
Fig. 22
Fig. 23

BLIND DECODING OF (E)PDCCH FOR PARTIAL SUBFRAMES

BACKGROUND

Technical Field

The present disclosure relates to methods for blind decoding of control signal candidates. The present disclosure is also providing the user equipment and a radio base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade.

The work item (WI) specification on Long-Term Evolution (LTE) called Evolved UMTS Terrestrial Radio Access (UTRA) and evolved UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair". The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP).

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands. All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmission(s) need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

Maximum five serving cells, including the PCell, can be configured at the moment for one UE.

The configuration and reconfiguration, as well as addition and removal, of component carriers can be performed by RRC. Activation and deactivation is done e.g., via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink. When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE Downlink Control Channel Structure—PCFICH, PHICH, PDCCH

In LTE, within one downlink subframe, the first 1-4 OFDM symbols are used for the downlink control channel and the downlink signal transmission (reference signals); these first OFDM symbol(s) can be called e.g., LTE control region. Three downlink physical control channels are provided in LTE which can be carried in the downlink control channel: PCFICH, PHICH and PDCCH, as will be described in more detail later. The downlink control signal also includes Cell-specific Reference Signals, CRS.

PCFICH

The PCFICH carries a control format indicator (CFI) which indicates the number of OFDM symbols used for transmission of the control channel information (downlink control region) in each subframe. For $N_{RB}^{DL} > 10$, the PCFICH value is between 0 and 3.

PHICH

The Physical hybrid ARQ indicator channel carries the hybrid-ARQ ACK/NACK, which indicates whether the eNodeB has correctly received a transmission on the PUSCH. The HARQ indicator is set to 0 for a positive acknowledgment (ACK) and 1 for a negative acknowledgment (NACK). The duration of PHICH, i.e., the number of OFDM symbols used for PHICH, is configured by higher layer. For normal PHICH, the duration is 1 OFDM symbol. For extended PHICH, the duration is 2-3 OFDM symbols. The duration of PHICH puts a lower limit on the size of the DL control region determined from the PCFICH value.

CRS

Cell-specific reference signals (CRS) are transmitted on one or several of antenna ports 0 to 3. In a normal subframe, CRS is distributed within the subframe across the whole bandwidth. In an MBSFN subframe, CRS shall only be transmitted in the non-MBSFN region, i.e., DL control region, of the MBSFN subframe.

PDCCH

The PDCCH (Physical Downlink Control CHannel) carries scheduling assignments and other control information and will be explained in detail below.

FIG. 3 shows the exemplary mapping of PDCCH and PDSCH within a normal subframe (having $2 \cdot N_{symb}^{DL} = 14$ OFDM symbols in the time domain), respectively a resource block pair (see magnification). In this exemplary case, the first $N_{symb}^{PDCCH} = 2$ OFDM symbols (PDCCH control region) are used for L1/L2 control signaling, i.e., for signaling the PDCCH, and the remaining $N_{symb}^{PDSCH} = 12$ OFDM symbols (PDSCH data region) are used for data transmission. Within the resource block pairs of all subframes, cell-specific reference signals, CRS (Common Reference Signal), are transmitted. These cell-specific reference signals are transmitted on one or several of antenna ports 0 to 3. In this example, the CRS are transmitted from two antenna ports: R0 is from antenna port 0 and R1 is from antenna port 1.

Physical Downlink Control Channel (PDCCH)

A PDCCH carries scheduling assignment messages as DCIs (Downlink Control Information) i.e., DCI messages. Each PDCCH is transmitted on an aggregation of one or more so called Control Channel Elements (CCEs), where each CCE corresponds to nine Resource Element Groups (REGs i.e., sets of four physical resource elements). Resource-element groups (REGs) are used for defining the mapping of control channels to resource elements. REGs constituting CCEs are not consecutive, and CCEs are distributed in frequency over the entire bandwidth. Note that CCEs are spread in the frequency domain to achieve frequency diversity. Four PDCCH formats are supported as listed in the following table 1, which also shows the corresponding possible CCE aggregation levels.

TABLE 1

PDCCH formats

| PDDCH format | Number of CCE; Aggregation level | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are numbered and used consecutively, and to simplify the decoding process, a PDCCH with a format consisting of n CCEs may only start with a CCE with a number equal to a multiple of n. The number of available CCEs in a cell varies; it may be semi-static (System bandwidth, PHICH configuration) or dynamic (PCFICH).

The number of CCEs used for transmission of a particular PDCCH is determined by the eNodeB according to channel conditions. For example, if the PDCCH is intended for a mobile terminal with a good downlink channel (e.g., close to the eNodeB), then one CCE is likely to be sufficient. However, for a mobile terminal with a poor channel (e.g., near the cell border), eight CCEs may be required in order to achieve sufficient robustness. In addition, the power level of a PDCCH may be adjusted to match the channel conditions.

In detecting a PDCCH, the mobile terminal shall monitor a set of PDCCH candidates for control information in every non-DRX subframe, where monitoring refers to the process of attempting to decode each of PDCCHs in the set according to all DCI formats, as will be explained in more detail later; the term "blind decoding" is also used in said respect.

FIGS. 4 and 5 illustrate an exemplary mapping of resource elements to resource element groups within a physical resource block pair. As apparent therefrom, one resource element group comprises four adjacent resource elements within each OFDM symbol. Further, the resource elements that are used for the common reference signals are not used for defining a resource element group; in other words, when assigning the resource elements to resource element groups, the CRS REs are accounted for. Therefore, depending on the position of the CRS in the first OFDM symbol (which is cell specific), the mapping of REs to REGs is different. In particular, when comparing FIGS. 4 and 5, in the first OFDM symbol 0 the REs of subcarriers 0, 1, 3, 4, 6, 7 and 9, 10, the differences are apparent; e.g., resource element of subcarrier 1 and OFDM symbol 0, may be either assigned to REG 1 (FIG. 4) or may be used instead as a CRS (FIG. 5).

Blind Decoding of PDCCHs at the User Equipment

In 3GPP LTE, the user equipment attempts to detect DCI(s) within the PDCCH using so-called "blind decoding". Since there is no associated control signaling that would indicate the CCE aggregation size or modulation and coding scheme actually used by the eNB for the PDCCHs transmitted in the downlink, the UE tests for all configured combinations of CCE aggregation sizes and modulation and coding schemes, and confirms the successful decoding of a PDCCH based on the RNTI. In LTE, different terminology can be used to describe the blind decoding. For instance, the blind decoding can also be seen as the process of monitoring by the UE a set of PDCCH (control channel signal) candidates for control information. The monitoring may comprises that the UE attempts to successfully decode each of the PDCCH candidates in the set according to all the monitored DCI formats. The set of PDCCH candidates to monitor are defined in terms of search spaces (for details on search spaces see later). The monitoring occurs in every non-DRX subframe.

To further limit complexity, a common and dedicated search space in the control signaling region is defined in which the user equipment searches for PDCCHs, i.e., performs the blind decoding. The eNodeB is capable of transmitting multiple PDCCHs in a subframe. The transmissions are organized such that a UE can locate the PDCCHs intended for it, while at the same time making efficient use of the resources allocated for PDCCH transmissions.

A simple approach, at least for the eNodeB, would be to allow the eNodeB to place any PDCCH anywhere in the PDCCH resources (or CCEs) indicated by the PCFICH. In this case, the UE would need to check all possible PDCCH locations, PDCCH formats, and DCI formats, and act on those messages with correct CRCs (the CRC is scrambled with a UE identity). Carrying out such a blind decoding of all the possible combinations would require the UE to make many PDDCH decoding attempts in every subframe. For small system bandwidths the computational load might be reasonable, but for large system bandwidths with a large number of possible PDCCH locations, it would become a significant burden, leading to excessive power consumption in the UE receiver.

The alternative approach adopted so far for LTE is to define for each UE a limited set of CCE locations where a PDCCH may be placed, also called a set of PDCCH candidates. Such a constraint may lead to some limitations as to the number of UEs to which PDCCHs can be sent within the same subframe, which would thus restrict the UEs to which the eNodeB could grant resources. Therefore, it is important for good system performance that the set of possible PDCCH locations available for each UE is not too small. The set of CCE locations in which the UE may find its PDCCHs can be considered as a search space.

Moreover, separate dedicated and common search spaces are defined, where a dedicated (also termed UE-specific) search space is configured for each UE individually, while all UEs are informed of the extent of the common search space. For instance, PDCCH for system information is transmitted in common search space, so that all the UEs can receive system information by monitoring the common search space. Note that the dedicated and common search spaces may overlap for a given UE. Up to Release 12, the common search space is only supported on PDCCH, while the dedicated search space is supported on PDCCH as well as on EPDCCH (see later for EPDCCH). UE-specific search space and common search space have different aggregation levels (see table 2 below).

With small search spaces it is quite possible in a given subframe that the eNodeB cannot find CCE resources to send PDCCHs to all the UEs that it would like to, because, having assigned some CCE locations, the remaining CCE locations are not in the search space of a particular UE. To minimize the possibility of such a blocking persisting into the next subframe, a UE-specific hopping sequence (derived from the UE identity) is applied to the starting positions of the UE-specific search spaces from subframe to subframe.

The starting location of the UE-specific search space on PDCCH is usually determined by a hashing function based e.g., on the slot number within the radio frame, the RNTI value and other parameters. The UE-specific search space allows aggregation levels of 1, 2, 4 and 8 CCEs. On EPDCCH, the location is more configurable, and the EPDCCH supports aggregation levels beyond 8, as will be explained in more detail later.

The physical downlink control channel procedure is defined in the 3GPP technical standard 36.213, current version 12.6.0, clause 9 "Physical downlink control channel procedures", incorporated herein by reference. The PDCCH assignment procedure discussed above in general terms is defined more specifically as follows.

The control region of each serving cell consists of a set of CCEs, number from 0 to $N_{CCE,k}-1$, wherein $N_{CCE,k}$ is the total number of CCEs in the control region of subframe k. The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined the same as in LTE and is given below, i=0, . . . , L−1. For the common search space m'=m. For the PDCCH UE-specific search space, for the serving cell on which PDCCH is monitored, if the monitoring UE is configured with carrier indicator field, then $m'=m+M^{(L)} \cdot n_{CI}$ where $n_{CI}$ is the carrier indicator field value. Else if the monitoring UE is not configured with carrier indicator field then m'=m, where m'=0, . . . , $M^{(L)}$. $M^{(L)}$ is the number of PDCCH candidates to monitor in the given search space. Note that the carrier indicator field value is the same as the serving cell index. For the common search spaces, $Y_k$ is set to 0 for the two aggregation levels L=4 and L=8. For the UE-specific search space $S_k^{(L)}$ at aggregation level L, the variable $Y_k$ is defined by $$Y_k = (A \cdot Y_{k-1}) \mod D$$

Therefore, on a serving cell where PDCCH is monitored, if another serving cell is scheduled on this serving cell, the search space of the scheduled serving cell is determined by the carrier indicator field value. Carrier indicator field value is the same as serving cell index. Therefore, carrier indicator field value has the range of 0-7, but a maximum of five values will be configured for one UE. As a result, at most five search spaces will be monitored. Each search space corresponds to one serving cell. However, PDCCH for one serving cell can be scheduled on the search space of another serving cell if the DCI format for the PDCCH is the same on two serving cells. In this case, to indicate which serving cell is scheduled, CIF in PDCCH can indicate the scheduled serving cell. CIF can also be useful when the search spaces from different serving cells overlap with each other. Currently, $n_{CI}$ equals CIF, equals serving cell index.

Overall, the PDCCH candidates monitored by a UE are apparent from the following table 2.

TABLE 2

PDCCH candidates monitored by UE

| | Search space $S_k^{(L)}$ | | Number of PDCCH |
| --- | --- | --- | --- |
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As apparent from the above table, in the UE-specific search space, there are {6, 6, 2, 2} number of PDCCH candidates at respective aggregation level {1, 2, 4, 8}, and the PDCCH candidates of each aggregation level are consecutive in CCEs. The starting CCE index of the first PDCCH candidate in aggregation level L is decided by $Y_k \times L$, where k is the subframe number and $Y_k$ is decided by k and UE ID. Therefore, the positions of CCEs in the UE-specific search space are decided by the UE ID to reduce the overlap of PDCCH UE-specific search space from different UEs and are randomized from subframe to subframe to randomized the interference from PDCCH in neighboring cells.

In the common search space, there are {4, 2} number of PDCCH candidates at aggregation level {4, 8}. The first PDCCH candidate in aggregation level L starts from CCE index 0. Therefore, all the UEs monitor the same common search space.

Resource Allocation Types

Conveying indications of physical layer resource allocation is one of the major functions of the PDCCHs. While the exact use of the PDCCHs depends on the other algorithms implemented in the eNodeB, it is nevertheless possible to outline some general principles of typical operation. In each subframe, PDCCHs indicate the frequency domain resource allocations. Resource allocations are normally localized, meaning that a physical resource block (PRB) in the first half of a subframe is paired with the PRB at the same frequency in the second half of the subframe.

The main design challenge for the signaling of frequency domain resource allocations is to find a good compromise between flexibility and signaling overhead. The most flexible, and arguably the simplest, approach is to send each UE a bitmap in which each bit indicates a particular PRB. This would work well for small system bandwidths, but for large system bandwidths (i.e., up to 110 PRBs) the bitmap would need 110 bits, which would be a prohibitive overhead—particularly for small packets, where the PDCCH message could be larger than the data packet. One possible solution would be to send a combined resource allocation message to all UEs, but this was rejected on the grounds of the high power needed to reach all UEs reliably, including those at the cell edges. The approaches adopted in the LTE are as follows. Different resource allocation types 0, 1, and 2 are defined with different characteristics.

Resource Allocation Type 0:

In resource allocations of Type 0, a bitmap indicates the resource block groups (RBGs) which are allocated to the scheduled UE, where an RBG is a set of consecutive PRBs. The RBG size is a function of the system bandwidth; i.e., with an increased downlink bandwidth the RBG size increases non-linearly.

Resource Allocation Type 1:

In resource allocations of Type 1, individual PRBs can be addressed, but only within a subset of the PRBs available in the component carrier or cell. The bitmap used is slightly smaller than for Type 0, since some bits are used to indicate which subset of the RBG is addressed, and a shift in the position of the bitmap. The total number of bits (including the use of additional flags) is the same as for Type 0. The motivation for providing this method of resource allocation is flexibility in spreading the resources across the frequency domain to exploit the frequency diversity.

Resource Allocation Type 2:

In resource allocations of Type 2, the resource allocation information indicates a contiguous set of Virtual Resource Blocks, VRBs, using either localized or distributed mapping to PRBs as indicated by a 1-bit flag in the resource allocation message. PRB allocations may vary from a single PRB up to a maximum number of PRBs spanning the system bandwidth. A Type 2 resource allocation field consists of a resource indication value (RIV) corresponding to a starting RB ($RB_{START}$) and a length in terms of contiguously allocated RBs ($L_{CRBs}$)

More specific information on the different resource allocation types can be found in TS 36.213, clause 7.1.6 "Resource Allocation", current version 12.6.0, incorporated herein by reference.

It may be noted that the size of the resource block information in the various DCI formats is a function of the resource allocation type, as well as of the system bandwidth. For the example of 6-110 PRB, the following table 3 shows how many bits are required for the corresponding downlink resource allocation type.

TABLE 3 required bits for downlink resource allocation type

| | 6 PRB | 15 PRB | 25 PRB | 50 PRB | 75 PRB | 100 PRB | 110 PRB |
| --- | --- | --- | --- | --- | --- | --- | --- |
| Resource allocation Type 0, 1 | 6 | 8 | 13 | 17 | 19 | 25 | 28 |
| Resource allocation Type 2 | 5 | 7 | 9 | 11 | 12 | 13 | 13 |

Additionally, uplink resource allocation types 0 and 1 are supported for PDCCH/EPDCCH with uplink DCI format. More specific information on the different resource allocation types for uplink can be found in TS 36.213, clause 8.1 "Resource allocation for PDCCH/EPDCCH with uplink DCI format" (current version 12.6.0) incorporated herein by reference.

LTE DL Data Region

In LTE, the downlink data region starts after the downlink control region and ends at the end of the subframe. In general, CRS, PDSCH and corresponding DMRS are transmitted in the downlink data region.

The Physical Downlink Shared Channel (PDSCH) is mapped to the remaining OFDM symbols within one subframe after the PDCCH. The PDSCH resources allocated for one UE is in the unit of resource blocks for each subframe. FIG. 3 shows the mapping of PDSCH in one PRB pair, which means two PRBs within one subframe. PDCCH is used to allocate the resources for PDSCH. According to the exemplary channel structure in FIG. 3, within one subframe, the first two OFDM symbols are used for control signaling and the remaining 12 OFDM symbols are used for data. CRS (Common Reference Signal) are cell-specific reference signals that shall be transmitted in all downlink subframes. DMRS (DeModulation Reference Signal) are UE-specific reference signals and are used for the demodulation of the PDSCH. DMRS is only transmitted within the resource blocks where the PDSCH for a certain UE is allocated. In order to support MIMO with DMRS, four DMRS layers are defined, which means at most MIMO of four layers is supported. In FIG. 3, DMRS layers 1, 2, 3, 4 are corresponding to MIMO layer 1, 2, 3, 4.

Enhanced-PDCCH

In Release 11, in order to manage the interference for PDCCH in macro-pico co-channel deployment scenarios and to enhance the limited PDCCH capacity, the enhanced PDCCH (EPDCCH) was introduced. The EPDCCH is transmitted in the PDSCH region in the unit of PRB pairs. In order to avoid affecting the legacy PDCCH, EPDCCH can be multiplexed with the PDSCH in the frequency domain. EPDCCH is transmitted spanning the PDSCH part of the subframe but not all subcarriers. UE has to wait until the end the subframe to decode the DCI carried on EPDCCH. In contrast, PDCCH is only transmitted up to three or four OFDM symbols. Therefore, compared with PDCCH, PDSCH decoding time is delayed in case of EPDCCH.

The EPCCH assignment procedure is defined in the 3GPP technical standard TS 36.213, current version 12.6.0, clause 9.1.4 "EPDCCH assignment procedure", incorporated herein by reference.

FIG. 6 schematically discloses the subframe content regarding PDCCH, PCFICH, PHICH, EPDCCH, and PDSCH, and further illustrates that for the EPDCCH 8 different eREG are exemplary assumed.

The possible PRB pairs for EPDCCH transmission are UE-specific configuration by higher layer. If the PRB pair is configured for EPDCCH but not used for EPDCCH transmission, it can be used for PDSCH transmission. Similar as for the PDCCH, the basic resource unit for EPDCCH is called Enhanced CCE (ECCE). Each ECCE consists of four or eight Enhanced REGs (EREGs). One PRB pair contains 16 EREGs.

16 EREGs indices are sequentially mapped to REs, first in frequency domain, then in time domain, avoiding the DMRS REs. The REs, where PDCCH, CRS and CSI-RS are transmitted, are not used for EPDCCH transmission. Therefore, the number of available REs in one REG for EPDCCH transmission varies. To keep the performance of ECCEs similar and predictable, one ECCE is formed of either four or eight EREGs, depending on the subframe type as shown in the following table 4.

TABLE 4

| | ECCE size | | | |
|---|---|---|---|---|
| | Normal cyclic prefix | | Extended cyclic prefix | |
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

EREGs are divided into four groups:
EREG group 0 contains EREG indices 0, 4, 8 and 12;
EREG group 1 contains EREG indices 1, 5, 9 and 13;
EREG group 2 contains EREG indices 2, 6, 10 and 14;
EREG group 3 contains EREG indices 3, 7, 11 and 15.

In case of ECCE consisting of four EREGs, the four EREGs come from the same EREG group. In case of ECCE consisting of eight EREGs, the eight EREGs come from EREG group 0 and 2 or from EREG group 1 and 3. FIG. 7 shows an example of one ECCE consisting of four EREGs. FIG. 8 shows an example of one ECCE consisting of eight EREGs. Whether the EREGs composing one ECCE are from the same PRB pair or different PRB pairs depends on the EPDCCH configuration. If localized EPDCCH is configured, one ECCE consists of EREGs from one PRB pair. If distributed EPDCCH is configured, one ECCE consists of ERGs from different PRB pairs.

The supported EPDCCH formats are listed in the following table 5.

TABLE 5

| | supported EPDCCH formats | | | |
|---|---|---|---|---|
| | Number of ECCEs for one EPDCCH, $N_{ECCE}^{EPDCCH}$ | | | |
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

In the above table, Case A and Case B are applied according to the following conditions:

Case A applies
    for normal subframes and normal downlink CP when DCI formats 2/2A/2B/2C/2D are monitored and $\hat{N}_{RB}^{DL} \geq 25$, or
    for special subframes with special subframe configuration 3, 4, 8 and normal downlink CP when DCI formats 2/2A/2B/2C/2D are monitored and $\hat{N}_{RB}^{DL} \geq 25$, or
    for normal subframes and normal downlink CP when DCI formats 1A/1B/1D/1/2/2A/2B/2C/2D/0/4 are monitored, and when $n_{EPDCCH} < 104$), or
    for special subframes with special subframe configuration 3, 4, 8 and normal downlink CP when DCI formats 1A/1B/1D/1/2A/2/2B/2C/2D/0/4 are monitored, and when $n_{EPDCCH}$<104

Case B applies for normal subframes and extended downlink CP when DCI formats 1A/1B/1D/1/2A/2/2B/2C/2D/0/4 are monitored or, for special subframes with special subframe configuration 1, 2, 6, 7, 9 and normal downlink CP when DCI formats 1A/1B/1D/1/2A/2/2B/2C/2D/0/4 are monitored, or for special subframes with special subframe configuration 1, 2, 3, 5, 6 and extended downlink CP when DCI formats 1A/1B/1D/1/2A/2/2B/2C/2D/0/4 are monitored;

EPDCCH Search Space

For each serving cell, higher layer signaling can configure a UE with one or two EPDCCH PRB sets for EPDCCH monitoring. Each EPDCCH PRB set can be configured for either localized EPDCCH transmission or distributed EPDCCH transmission. The UE shall monitor a set of EPDCCH candidates on one or more activated serving cells for control information. The set of EPDCCH candidates to monitor are defined in terms of EPDCCH UE-specific search space. For each serving cell, the subframes where UE monitors EPDCCH UE-specific are configured by high layer.

An EPDCCH UE-specific search space $ES_k^{(L)}$ at aggregation level $L \in \{1, 2, 4, 8, 16, 32\}$ is defined by a set of EPDCCH candidates. For an EPDCCH-PRB-set p, the ECCEs corresponding to EPDCCH candidate m of the search space $ES_k^{(L)}$ are given by $b = n_{CI}$ if the UE is configured with a carrier indicator field for the serving cell on which EPDCCH is monitored, otherwise $b = 0$ $n_{CI}$ is the carrier indicator field value, $$m = 0, 1, \ldots M_p^{(L)} - 1,$$

If the UE is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored, as given in the following tables 6-15; otherwise, $M_p^{(L)}$ is the number of EPDCCH candidates to monitor at aggregation level L in EPDCCH-PRB-set p for the serving cell indicated by $n_{CI}$.

Case 1 in these tables is the same as Case A discussed above, and Case 2 is the same as Case B discussed above. Case 3 applies to the other cases besides Case 1 and Case 2.

TABLE 6

EPDCCH candidates monitored by a UE
(One Distributed EPDCCH-PRB-set - Case 1, Case 2)

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

TABLE 7

EPDCCH candidates monitored by a UE
(One Distributed EPDCCH-PRB-set - Case 3)

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

TABLE 8

EPDCCH candidates monitored by a UE
(One Localized EPDCCH-PRB-set - Case 1, Case 2)

| | Number of EPDCCH candidates $M_p^{(L)}$ for Case 1 | | | | Number of EPDCCH candidates $M_p^{(L)}$ for Case 2 | | | |
|---|---|---|---|---|---|---|---|---|
| $N_{RB}^{X_p}$ | L = 2 | L = 4 | L = 8 | L = 16 | L = 1 | L = 2 | L = 4 | L = 8 |
| 2 | 4 | 2 | 1 | 0 | 4 | 2 | 1 | 0 |
| 4 | 8 | 4 | 2 | 1 | 8 | 4 | 2 | 1 |
| 8 | 6 | 6 | 2 | 2 | 6 | 6 | 2 | 2 |

$$L\left\{\left(Y_{p,k} \left\lfloor \frac{m \cdot N_{ECCE,p,k}}{L \cdot M_p^{(L)}} \right\rfloor + b\right) \bmod \lfloor N_{ECCE,p,k} / L \rfloor\right\} + i$$

where $Y_{p,k}$ is defined below, $i = 0, \ldots, L-1$, where L is the aggregation level; the supported aggregation levels are shown in later tables,

TABLE 9

EPDCCH candidates monitored by a UE (One Localized EPDCCH-PRB-set - Case 3)

| $N_{RB}^{Xp}$ | Number of EPDCCH candidates $M_p^{(L)}$ for Case 3 | | | |
|---|---|---|---|---|
| | L = 1 | L = 2 | L = 4 | L = 8 |
| 2 | 8 | 4 | 2 | 1 |
| 4 | 6 | 6 | 2 | 2 |
| 8 | 6 | 6 | 2 | 2 |

TABLE 10

EPDCCH candidates monitored by a UE (Two Distributed EPDCCH-PRB-sets - Case 1, Case 2)

| $N_{RB}^{Xp1}$ | $N_{RB}^{Xp2}$ | Number of EPDCCH candidates $[M_{p1}^{(L)}, M_{p2}^{(L)}]$ for Case 1 | | | | | Number of EPDCCH candidates $[M_{p1}^{(L)}, M_{p2}^{(L)}]$ for Case 2 | | | | |
|---|---|---|---|---|---|---|---|---|---|---|---|
| | | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 3, 3 | 3, 3 | 1, 1 | 1, 1 | 0, 0 | 3, 3 | 3, 3 | 1, 1 | 1, 1 | 0, 0 |
| 8 | 8 | 3, 3 | 2, 2 | 1, 1 | 1, 1 | 1, 1 | 3, 3 | 2, 2 | 1, 1 | 1, 1 | 1, 1 |
| 4 | 2 | 5, 3 | 3, 2 | 1, 1 | 1, 0 | 0, 0 | 5, 3 | 3, 2 | 1, 1 | 1, 0 | 0, 0 |
| 8 | 2 | 4, 2 | 4, 2 | 1, 1 | 1, 0 | 1, 0 | 4, 2 | 4, 2 | 1, 1 | 1, 0 | 1, 0 |
| 8 | 4 | 3, 3 | 2, 2 | 2, 1 | 1, 1 | 1, 0 | 3, 3 | 2, 2 | 2, 1 | 1, 1 | 1, 0 |

TABLE 11

EPDCCH candidates monitored by a UE (Two Distributed EPDCCH-PRB-sets - Case 3)

| $N_{RB}^{Xp1}$ | $N_{RB}^{Xp2}$ | Number of EPDCCH candidates $[M_{p1}^{(L)}, M_{p2}^{(L)}]$ for Case 3 | | | | |
|---|---|---|---|---|---|---|
| | | L = 1 | L = 2 | L = 4 | L = 8 | L = 16 |
| 2 | 2 | 2, 2 | 3, 3 | 2, 2 | 1, 1 | 0, 0 |
| 4 | 4 | 2, 2 | 2, 2 | 2, 2 | 1, 1 | 1, 1 |
| 8 | 8 | 2, 2 | 2, 2 | 2, 2 | 1, 1 | 1, 1 |
| 4 | 2 | 3, 1 | 3, 2 | 3, 1 | 1, 1 | 1, 0 |
| 8 | 2 | 3, 1 | 4, 1 | 3, 1 | 1, 1 | 1, 0 |
| 8 | 4 | 2, 2 | 2, 2 | 2, 2 | 1, 1 | 1, 1 |

TABLE 12

EPDCCH candidates monitored by a UE (Two Localized EPDCCH-PRB-sets - Case 1, Case 2)

| $N_{RB}^{Xp1}$ | $N_{RB}^{Xp2}$ | Number of EPDCCH candidates $[M_{p1}^{(L)}, M_{p2}^{(L)}]$ for Case 1 | | | | Number of EPDCCH candidates $[M_{p1}^{(L)}, M_{p2}^{(L)}]$ for Case 2 | | | |
|---|---|---|---|---|---|---|---|---|---|
| | | L = 2 | L = 4 | L = 8 | L = 16 | L = 1 | L = 2 | L = 4 | L = 8 |
| 2 | 2 | 4, 4 | 2, 2 | 1, 1 | 0, 0 | 4, 4 | 2, 2 | 1, 1 | 0, 0 |
| 4 | 4 | 3, 3 | 3, 3 | 1, 1 | 1, 1 | 3, 3 | 3, 3 | 1, 1 | 1, 1 |
| 8 | 8 | 3, 3 | 3, 3 | 1, 1 | 1, 1 | 3, 3 | 3, 3 | 1, 1 | 1, 1 |
| 4 | 2 | 4, 3 | 4, 2 | 1, 1 | 1, 0 | 4, 3 | 4, 2 | 1, 1 | 1, 0 |
| 8 | 2 | 5, 2 | 4, 2 | 1, 1 | 1, 0 | 5, 2 | 4, 2 | 1, 1 | 1, 0 |
| 8 | 4 | 3, 3 | 3, 3 | 1, 1 | 1, 1 | 3, 3 | 3, 3 | 1, 1 | 1, 1 |

TABLE 13

EPDCCH candidates monitored by a UE (Two Localized EPDCCH-PRB-sets - Case 3)

| $N_{RB}^{Xp1}$ | $N_{RB}^{Xp2}$ | Number of EPDCCH candidates $[M_{p1}^{(L)}, M_{p2}^{(L)}]$ for Case 3 | | | |
|---|---|---|---|---|---|
| | | L = 1 | L = 2 | L = 4 | L = 8 |
| 2 | 2 | 3, 3 | 3, 3 | 1, 1 | 1, 1 |
| 4 | 4 | 3, 3 | 3, 3 | 1, 1 | 1, 1 |
| 8 | 8 | 3, 3 | 3, 3 | 1, 1 | 1, 1 |
| 4 | 2 | 4, 2 | 4, 2 | 1, 1 | 1, 1 |
| 8 | 2 | 4, 2 | 4, 2 | 1, 1 | 1, 1 |

TABLE 13-continued

EPDCCH candidates monitored by a UE (Two Localized EPDCCH-PRB-sets - Case 3)

| $N_{RB}^{Xp1}$ | $N_{RB}^{Xp2}$ | Number of EPDCCH candidates $[M_{p1}^{(L)}, M_{p2}^{(L)}]$ for Case 3 | | | |
|---|---|---|---|---|---|
| | | L = 1 | L = 2 | L = 4 | L = 8 |
| 8 | 4 | 3, 3 | 3, 3 | 1, 1 | 1, 1 |

TABLE 14

EPDCCH candidates monitored by a UE (NOTE)

| $N_{RB}^{Xp1}$ | $N_{RB}^{Xp2}$ | Number of EPDCCH candidates $[M_{p1}^{(L)}, M_{p2}^{(L)}]$ for Case 1 | | | | | Number of EPDCCH candidates $[M_{p1}^{(L)}, M_{p2}^{(L)}]$ for Case 2 | | | | |
|---|---|---|---|---|---|---|---|---|---|---|---|
| | | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 4, 2 | 4, 3 | 0, 2 | 0, 1 | 0, 0 | 4, 2 | 4, 3 | 0, 2 | 0, 1 | 0, 0 |
| 8 | 8 | 4, 1 | 4, 2 | 0, 2 | 0, 2 | 0, 1 | 4, 1 | 4, 2 | 0, 2 | 0, 2 | 0, 1 |
| 2 | 4 | 4, 3 | 2, 4 | 0, 2 | 0, 1 | 0, 0 | 4, 3 | 2, 4 | 0, 2 | 0, 1 | 0, 0 |
| 2 | 8 | 4, 1 | 2, 2 | 0, 4 | 0, 2 | 0, 1 | 4, 1 | 2, 2 | 0, 4 | 0, 2 | 0, 1 |
| 4 | 2 | 5, 2 | 4, 2 | 1, 1 | 1, 0 | 0, 0 | 5, 2 | 4, 2 | 1, 1 | 1, 0 | 0, 0 |
| 4 | 8 | 4, 1 | 4, 2 | 0, 2 | 0, 2 | 0, 1 | 4, 1 | 4, 2 | 0, 2 | 0, 2 | 0, 1 |
| 8 | 2 | 5, 1 | 4, 2 | 2, 1 | 1, 0 | 0, 0 | 5, 1 | 4, 2 | 2, 1 | 1, 0 | 0, 0 |
| 8 | 4 | 6, 1 | 4, 2 | 0, 2 | 0, 1 | 0, 0 | 6, 1 | 4, 2 | 0, 2 | 0, 1 | 0, 0 |

NOTE:
One localized EPDCCH-PRB-set and one distributed EPDCCH-PRB-set, - Case 1, Case 2;
$p_1$ is the identity of the localized EPDCCH-PRB-set,
$p_2$ is the identity of the distributed EPDCCH-PRB-set

TABLE 15

EPDCCH candidates monitored by a UE (NOTE)

| $N_{RB}^{Xp1}$ | $N_{RB}^{Xp2}$ | Number of EPDCCH candidates $[M_{p1}^{(L)}, M_{p2}^{(L)}]$ for Case 3 | | | | |
|---|---|---|---|---|---|---|
| | | L = 1 | L = 2 | L = 4 | L = 8 | L = 16 |
| 2 | 2 | 4, 1 | 4, 2 | 2, 2 | 0, 1 | 0, 0 |
| 4 | 4 | 4, 1 | 4, 1 | 2, 2 | 0, 1 | 0, 1 |
| 8 | 8 | 4, 1 | 4, 1 | 2, 2 | 0, 1 | 0, 1 |
| 2 | 4 | 4, 1 | 4, 1 | 2, 2 | 0, 1 | 0, 1 |
| 2 | 8 | 4, 1 | 4, 1 | 2, 2 | 0, 1 | 0, 1 |
| 4 | 2 | 4, 1 | 4, 1 | 2, 2 | 1, 1 | 0, 0 |
| 4 | 8 | 4, 1 | 4, 1 | 2, 2 | 0, 1 | 0, 1 |
| 8 | 2 | 4, 1 | 4, 1 | 4, 1 | 0, 1 | 0, 0 |
| 8 | 4 | 4, 1 | 4, 1 | 2, 2 | 0, 1 | 0, 1 |

NOTE:
One localized EPDCCH-PRB-set and one distributed EPDCCH-PRB-set - Case 3);
$p_1$ is the identity of the localized EPDCCH-PRB-set,
$p_2$ is the identity of the distributed EPDCCH-PRB-set)

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum. LTE operation on unlicensed bands will therefore at least in the beginning be considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers). This includes that a common DRX scheme is used for LAA, particularly if it does not result in a need for very short DRX cycles/very long Active Times. As with carrier aggregation mentioned above, "common DRX" scheme in this respect means that the UE operates the same DRX for all aggregated and activated cells, including unlicensed and licensed cells. Consequently, the Active Time is the same for all serving cells, e.g., UE is monitoring PDCCH of all downlink serving cells in the same subframe; the DRX-related timers and parameters are configured per UE.

A very basic scenario is illustrated in FIG. 9, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed that the LAA will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which depend on region and particular frequency band; a comprehensive description of the regulatory requirements for all regions for operation on unlicensed bands at 5 GHz is given in R1-144348, "Regulatory Requirements for Unlicensed Spectrum", Alcatel-Lucent et al., RAN1#78bis, September 2014 incorporated herein by reference as well as the 3GPP Technical Report 36.889, current version 13.0.0. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

The listen-before-talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

In unlicensed spectrum, channel availability cannot always be guaranteed. In addition, certain regions such as Europe and Japan prohibit continuous transmissions and impose limits on the maximum duration of a transmission burst in the unlicensed spectrum. Hence, discontinuous transmission with limited maximum transmission duration is a required functionality for LAA. DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, associated with the master, to implement radar detection.

The operation on unlicensed bands at 5-GHz is in most regions limited to rather low transmit power levels compared to the operation on licensed bands which results in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused for other devices operating on the same unlicensed band.

Detailed information can be found in the harmonized European standard ETSI EN 301 893, current version 1.8.0, incorporated herein by reference.

Following this European regulation regarding LBT, devices have to perform a Clear Channel Assessment (CCA) before occupying the radio channel with a data transmission. It is only allowed to initiate a transmission on the unlicensed channel after detecting the channel as free based e.g., on energy detection. In particular, the equipment has to observe the channel for a certain minimum time (e.g., for Europe 20 μs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment has transmissions on a given carrier without re-evaluating the availability of that carrier (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be e.g., 4 ms as currently defined for Europe. Furthermore, there is a minimum Idle time the UE is not allowed to transmit after a transmission on the unlicensed cell, the minimum Idle time being at least 5% of the Channel Occupancy Time. Towards the end of the Idle Period, the UE can perform a new CCA, and so on. This transmission behavior is schematically illustrated in FIG. 10, the figure being taken from ETSI EN 301 893 (there FIG. 2: "Example of timing for Frame Based Equipment").

FIG. 11 illustrates the timing between a Wi-Fi transmission and LAA UE transmissions on a particular frequency band (unlicensed cell). As can be seen from FIG. 11, after the Wi-Fi burst, a CCA gap is at least necessary before the eNB "reserves" the unlicensed cell by transmitting a reservation signal until the next subframe boundary. Then, the actual LAA DL burst is started. In FIG. 11, the subframe boundaries are the only possible starting positions for the eNB transmitting a subframe, which however is disadvantageous since the reservation signal may need to be transmitted for almost all of a subframe duration.

Partial Subframes for LTE in Unlicensed Bands

Wi-Fi nodes that operate in the same band with the LTE node will not follow the LTE subframe boundary pattern which means that the channel can become free at any moment within two subframe boundaries, as can be seen in FIG. 11.

It has been agreed at RAN1 during the LAA study item phase that the subframe boundaries of licensed PCell and unlicensed SCell(s) will be aligned, as apparent from TR 36.889, current version 13.0.0, section 7.2.1.1. This means that the subframe boundaries will not be adapted to the channel occupation conditions that determine the channel access behavior by means of clear channel assessment (CCA). In order to grab the channel after a successful CCA, the eNB can therefore transmit a reservation signal that blocks the channel until the next subframe boundary is reached (see FIG. 11). Since the reservation signal does not carry any user data in terms of PDSCH, it should be kept at a minimum.

In order to increase the spectral efficiency of LAA transmissions, the concept of partial subframes has been proposed by different companies and is currently under discussion at RAN1 as described in TR 36.889, section 7.2.1.4. A partial subframe is a subframe that does not occupy all OFDM symbols between the two subframe boundaries, in contrast to full subframes that occupy all resources between two consecutive subframe boundaries. The use of partial subframes for LAA is depicted in FIG. 12, which exemplary assumes two possible starting positions within two subframe boundaries of the subframe timing pattern (given by the eNodeB); one is the subframe boundary and the second one is exemplary assumed to be the slot boundary. In view of that the Wi-Fi burst as well as the CCA is finished before the slot boundary, the (partial) subframe of depicted in FIG. 12 may start at the slot boundary, i.e., in the middle of the subframe pattern. As apparent from FIG. 12, by allowing (partial) subframes to begin at some point (OFDM symbol), the reservation signal can be shortened, and the LAA data burst starts earlier. Furthermore, in case the transmission of a reservation signal is not supported, the use of partial subframes increases the chance that the channel can be occupied before another Wi-Fi burst.

FIG. 13 also illustrates the use of partial subframes, however assumes four possible starting positions; the first starting position being the (first) subframe boundary, the second starting position being an OFDM symbol in the first slot (e.g., starting with OFDM symbol 3), the third starting position being the slot boundary, and the fourth starting position being an OFDM symbol in the second slot (e.g., the same corresponding OFDM symbol of the first slot, i.e., OFDM symbol 3, or another OFDM symbol). In the example chosen in FIG. 11 to 13, the Wi-Fi burst and the CCA ends just before the second starting position, such that the eNB may almost immediately start with the LAA downlink burst; the (necessary) reservation signal is thus kept very brief.

No agreement was reached so far in the 3GPP meetings on the number and position of possible/allowed starting positions within a subframe duration/pattern. Theoretically, it can be assumed that at most 14 starting positions are possible, i.e., at each start of an OFDM symbol of a subframe as depicted in FIG. 14 (assuming normal cyclic prefix). At least, it can be assumed that there will be two starting positions, one at the first subframe boundary, and the second at any other start of an OFDM symbol (e.g., the slot boundary).

Moreover, it is also possible to support partial subframes at the end of an LAA burst as well; a partial subframe starting at the subframe boundary but ending before the next subframe boundary. The benefit of using an additional partial subframe at the end of the LAA burst is that this allows for efficient utilization of the allowed maximum channel occupation duration, such as for example 4 ms in Japan as described in TR 36.889. In other words, a partial subframe can end at the second subframe boundary (the same as full subframes), but may also end before (at any of the OFDM symbols); no final decisions have yet been reached in 3GPP in said respect.

Same as for full subframes, a partial subframe may comprise a control region for the control signals (e.g., PDCCH) in addition to a data region in the time domain as shown in FIG. 15 which is almost identical with FIG. 13, however additionally illustrates the PDCCH at the beginning of the partial/full subframes. Corresponding to the LTE operation in licensed bands, the control region carries e.g., the scheduling information related to the PDSCH allocation in the subsequent data region. The control region is required in case of self-scheduling of PDSCH transmissions on the unlicensed SCell by means of PDCCHs, while it is not required in case of cross-scheduling from a licensed PCell. Self-scheduling with EPDCCH on the unlicensed SCell is another option. This would not necessarily require a control region in time domain since the EPDCCH is multiplexed with the PDSCH in frequency domain. There was so far no agreement at 3GPP on the supported scheduling schemes for LAA.

In general, the length of a partial subframe at the beginning of an LAA burst (i.e., the starting position) is unknown in advance since both the transmitting eNB and the receiving UE do not know at which point of time the channel can be occupied based on successful CCA.

It is possible to reduce the number of possible starting points (in terms of OFDM symbols) of the first partial subframe of an LLA burst, such as for example subframe boundary and the middle between two subframe boundaries, corresponding to full and half subframe, as assumed for FIG. 12.

The following discussion will focus on the use of partial subframes at the start of an LAA downlink burst without reservation signal, control region and restrictions of the partial subframe length in terms of allowed starting positions.

Considering the different regulatory requirements, it is apparent that the LTE specification for introducing partial subframe support will require several changes compared to the current Rel-12 specification.

BRIEF SUMMARY

Non-limiting and exemplary embodiments provide improved methods for blind decoding control signal candidates for a partial subframe scenario. The independent claims provide non-limiting and exemplary embodiments. Advantageous embodiments are subject to the dependent claims.

According to several implementations of the aspect described herein, the downlink control channel transmission is improved from the point of view of the radio base station and the user equipment. In order to discuss these implementations, the following assumptions are made. It is assumed that the radio base station as well as the user equipment support the use of partial subframes, besides using normal full subframes to transmit data in the downlink. Correspondingly, a plurality of starting positions are preconfigured within a subframe duration, i.e., between two subsequent subframe boundaries that are defined by a particular subframe timing given by the radio base station in its radio cell. Put differently, a full subframe spans the whole subframe duration, i.e., starting at the first (first in the time domain) subframe boundary (i.e., the first starting position) and ending at the second subframe boundary; on the other hand, the partial subframe does not span the whole subframe duration, i.e., it may start from any of the defined starting positions and ends at the second subframe boundary. Although up to 14 starting positions are theoretically possible within a subframe duration (assuming 14 OFDM symbols), the discussion will focus on scenarios where two respectively four different starting positions are allowable/possible for each (full/partial) subframe.

Furthermore, a blind decoding mechanism shall be used by the UE to receive control signal(s) from the radio base station, in a similar manner as implemented in the 3GPP standard explained in the background section. Correspondingly, according to the blind decoding mechanism, control signal candidates are preconfigured between the radio base station and a UE, each of the control signal candidates being theoretically usable by the radio base station to transmit a control signal to the UE. The UE in turn, when blind decoding (all of) the control signal candidates, will successfully decode the one control signal candidate actually carrying the control signal. The control signal may for example indicate the resources that are used to transmit data in the downlink within the same subframe.

Such a set of control signal candidates can be defined for the first starting position of a subframe but may also be likewise defined for the remaining starting positions that are allowable for a partial subframe. In other words, a first set of control signal candidates is preconfigured for the user equipment for the first starting position; the first starting position being the first subframe boundary within a subframe duration given by the subframe timing pattern. In one exemplary implementation, this first set of control signal candidates can be configured the same as anyone of the 3GPP standard as described in the background section. In addition, for each of the remaining starting positions (i.e., the second time-wise starting position up to the last starting position), a further set of control signal candidates can be preconfigured between the radio base station and the UE, which the UE shall blind decode for receiving a control signal. According to the implementations, the number of control signal candidates of at least one of the candidate sets configured for the partial subframe starting positions shall be less than the number of control signal candidates configured for the first starting position. For example, when assuming two starting positions in total (the first starting position being the subframe boundary and the second starting position being the slot boundary), while the set of candidates for the subframe boundaries can comprise e.g., 16 candidates, the set of candidates for the slot boundaries can comprise e.g., 8 candidates.

Consequently, for each subframe duration, the UE blind decodes the set of control signal candidates at least for the first starting position, and possibly blind decodes the further sets of control signal candidates for the remaining starting positions. Assuming that the radio base station used one of the control signal candidates to actually transmit a control signal to the UE, the UE will eventually successfully decode one of the various control signal candidates and thus retrieve the corresponding control signal transmitted from the radio base station.

Consequently, the user equipment will be able to determine the start of a partial subframe when successfully decoding one of the corresponding control signal candidates at a particular starting position. On the other hand, by reducing the number of control signal candidates at starting position(s) for a partial subframe, the user equipment has to perform less than blind decoding attempts which reduces the UE complexity, the UE processing, and the delay for the decoding of data and also the false alarm probability for the control signal decoding in general.

Different implementations may be possible here, for instance as to whether the user equipment will continue blind decoding the control signal candidates also the remaining starting positions even after successfully blind decoding a control signal candidate within the subframe duration. In particular, it can be assumed that the radio base station will only use one of the various starting positions to transmit data, i.e., the full/partial subframe will start at only one starting position. Consequently, the UE, after blind decoding all control signal candidates configured for one starting position and successfully decoding at least one control signal therein, the UE may not continue to blind decode the control signal candidates at the remaining starting positions. Put differently, the UE will blind decode at least the control signal candidates configured for the first starting position, and in case no control signal was successfully decoded, the UE may continue to blind decode the control signal candidates configured for the next starting position and so on until either it successfully decodes a control signal from a control signal candidate or until the last starting position; the same procedure is repeated then at the next subframe duration.

On the other hand, in order to cope with situations where the UE has false detected a control signal in a control signal candidate of a starting position, it may also be useful for the UE to always continue the blind decoding of the control signal candidates for other starting positions so as to be able to receive the correct control signal (if any) afterwards.

As mentioned above, one scenario in which the present invention can be applied is the licensed assisted access with licensed and unlicensed cells discussed in the background section. Correspondingly, the scenario assumed involves at least one unlicensed cell and at least one licensed cell, wherein the partial subframe support shall be provided on the unlicensed cell, on which also Wi-Fi nodes can transmit data. Correspondingly, particularly for an unlicensed cell the radio base station shall be able to start a subframe not only at the subframe boundaries but also at other starting positions configured between two subframe boundaries. In turn, the blind decoding of control signal candidates at further starting positions between two subframe boundaries should only be performed by the user equipment on unlicensed cells.

In one particular implementation, the various sets of control signal candidates preconfigured for the various starting positions can be such that the number of control signal candidates to be blind decoded by the user equipment at any one of the additional starting positions (i.e., not at the subframe boundaries) shall be less than the number of control signal candidates to be blind decoded by the UE at the subframe boundaries. Furthermore, in one example the number of control signal candidates is reduced from one starting position to the next such that the later the starting position within the subframe duration the less control signal candidates are preconfigured for that starting position. For instance, in the number of control signal candidates may decrease linearly for the starting positions within the subframe duration.

According to a further exemplary implementation, the control region of a partial subframe (i.e., starting at a partial subframe starting position) can be shorter than the corresponding control region of a full subframe. For instance, a control region for a full subframe is located at the beginning of the full subframe and can span a duration of 0 to 3 OFDM symbols (the normal PDCCH control region is assumed here as an example, not the EPDCCH). As explained before for the aspect, less control signal candidates can be foreseen for partial subframe starting position. So as to further increase the usable resources for the data transmission, the control region part of a partial subframe can be reduced, particularly in view of that also less control signal candidates have to be provided therein. For instance, while providing a control region of 3 OFDM symbols for full subframes, a partial subframe may be configured with a control region of merely one OFDM symbol.

According to further implementations of the aspect, the number blind decoding candidates within a subframe duration shall not be increased when supporting partial subframes. In particular, even in case the user equipment supports partial subframe, it is still left for configuration by the eNB whether partial subframes shall indeed be used or not. The user equipment and radio base station will use different sets of control signal candidates depending on whether partial subframe support is enabled or not. In particular, when partial subframe support is not enabled, the set of control signal candidates can be configured for the subframe boundaries as usual; for instance, 16 candidates can be available; no further sets for other starting positions are necessary.

On the other hand, when the partial subframe support is enabled, a different set of control signal candidates is configured for the subframe boundaries than when the partial subframe support is not enabled. Overall, the various sets of control signal candidates for all the stating positions within a subframe duration is such that their number of control signal candidates is equal to the number of control signal candidates configured for the subframe boundaries when partial subframe support is disabled. When assuming two starting positions and the above-explained example of 16 candidates for the subframe boundaries, the control signal candidate set for the both the subframe boundaries and the other starting positions (e.g., slot boundaries) comprise 8 candidates each, thus equaling the number of candidates without partial subframe support. This has the advantage that the total number of blind decoding to be performed by the UE does not change when enabling or disabling partial subframe support.

So far, a control signal was generally assumed. In particular implementations, the control signal can be the PDCCH or the EPDCCH. The control region when PDCCH is used (no EPDCCH) is located at the beginning of the full/partial subframe, and may further comprise other control channels such as the PHICH and PCFICH. When EPDCCH, instead of PDCCH, is used, there can be basically two control regions, the first one being located at the beginning of the full/partial subframe (as for PDCCH, and can still carry the PCFICH, PHIHC), while the second one is located in the data region configured for the full/partial subframe, e.g., covering the complete data region in the time domain but only partial frequency regions in the frequency domain.

Correspondingly, in one general first aspect, the techniques disclosed here feature a method for blind decoding control signal candidates that are preconfigured by a radio base station for a user equipment in a control region of each subframe of a radio cell in a mobile communication system so as to be usable by the radio base station to transmit one or more control signals to the user equipment. A plurality of starting positions are preconfigured between two subsequent subframe boundaries, a first starting position being the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The user equipment for each subframe, for at least the first starting position out of the plurality of starting positions, blind decodes the set of control signal candidates preconfigured for that starting position so as to receive the one or more control signals for the subframe.

Correspondingly, in one general first aspect, the techniques disclosed here feature a user equipment for blind decoding control signal candidates that are preconfigured by a radio base station for the user equipment in a control region of each subframe of a radio cell in a mobile communication system so as to be usable by the radio base station to transmit one or more control signals to the user equipment. A plurality of starting positions are preconfigured between two subsequent subframe boundaries, a first starting position being the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The user equipment comprises means (e.g., processor, receiver etc.) to blind decode for each subframe, for at least the first starting position out of the plurality of starting positions, the set of control signal candidates preconfigured for that starting position so as to receive the one or more control signals for the subframe.

Correspondingly, in one general first aspect, the techniques disclosed here feature a radio base station for transmitting one of more control signals to a user equipment. Control signal candidates are preconfigured by the radio base station for the user equipment so as to usable by the radio base station to transmit the one or more control signals to the user equipment. A plurality of starting positions are preconfigured between two subsequent subframe boundaries. A first starting position is the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The radio base station comprises a processor to determine one of the plurality of starting positions to start the transmission of data. The processor further determines one control signal candidate from the set of control signal candidates preconfigured for the determined starting position. A transmitter of the radio base station transmits the control signal using the determined control signal candidate of the determined starting position.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE DRAWINGS

In the following exemplary embodiments are described in more detail with reference to the attached figures and drawings.

FIGS. 4 and 5 illustrate the resource element to resource element group mapping for the PDCCH region, differing depending on the positioning of the common reference signals in OFDM symbol 1, FIGS. 7 and 8 illustrate different EPDCCH, respectively where one ECCE consists of four EREGs and one ECCE consists of eight EREGs, FIG. 21 illustrates the control regions and blind decoding opportunities at the UE for a scenario supporting partial subframes at two different positions per subframe duration, when EPDCCH is assumed for carrying the control regions, according to another exemplary implementation of the first embodiment, FIGS. 22 and 23 illustrate the control regions and blind decoding opportunities at the UE for a scenario supporting partial subframes at four different positions per subframe duration, when EPDCCH is assumed for carrying the control regions, according to other exemplary implementations of the first embodiment.

DETAILED DESCRIPTION

Figure 1:
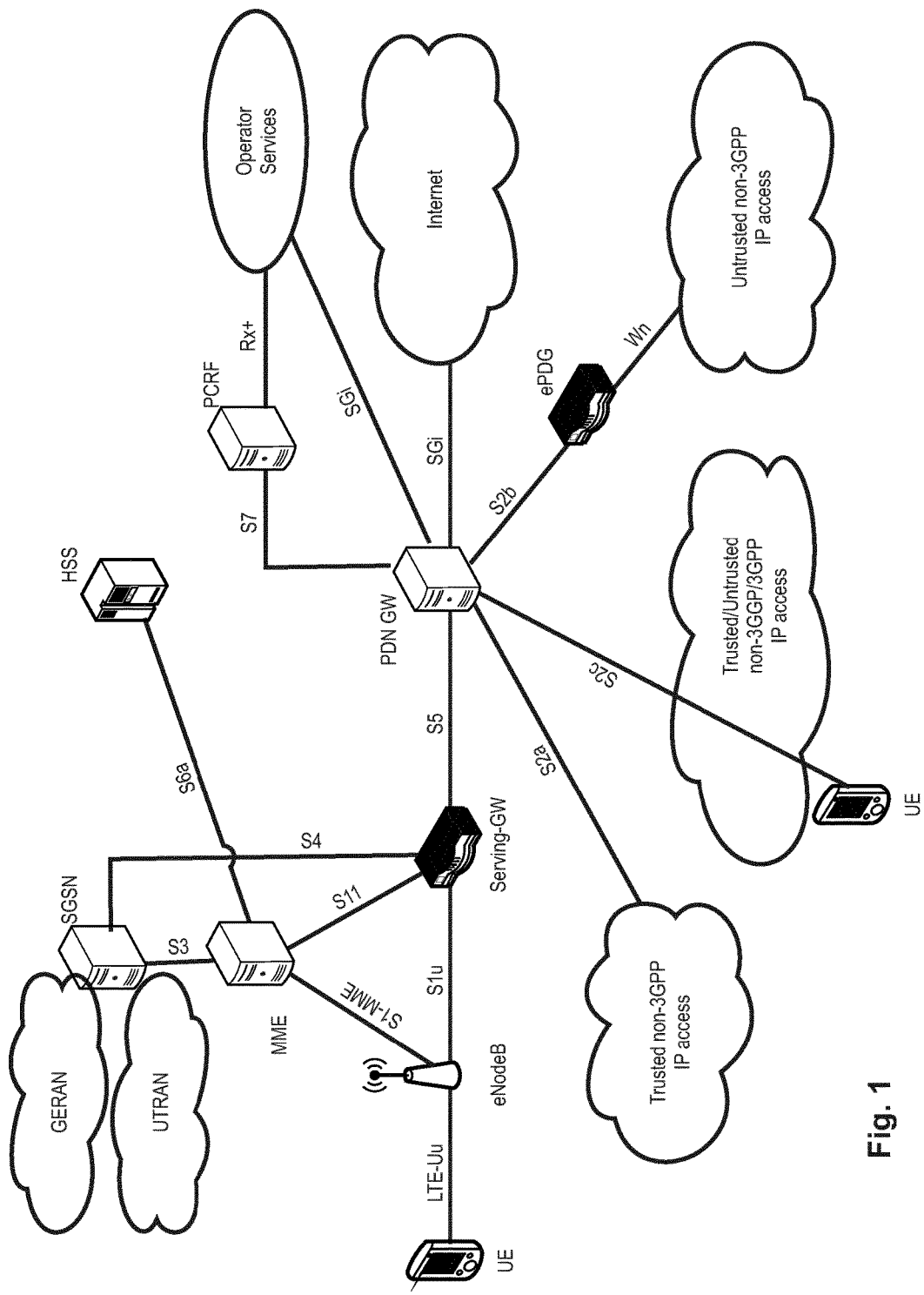
FIG. 1 shows an exemplary architecture of a 3GPP LTE system.
Figure 2:
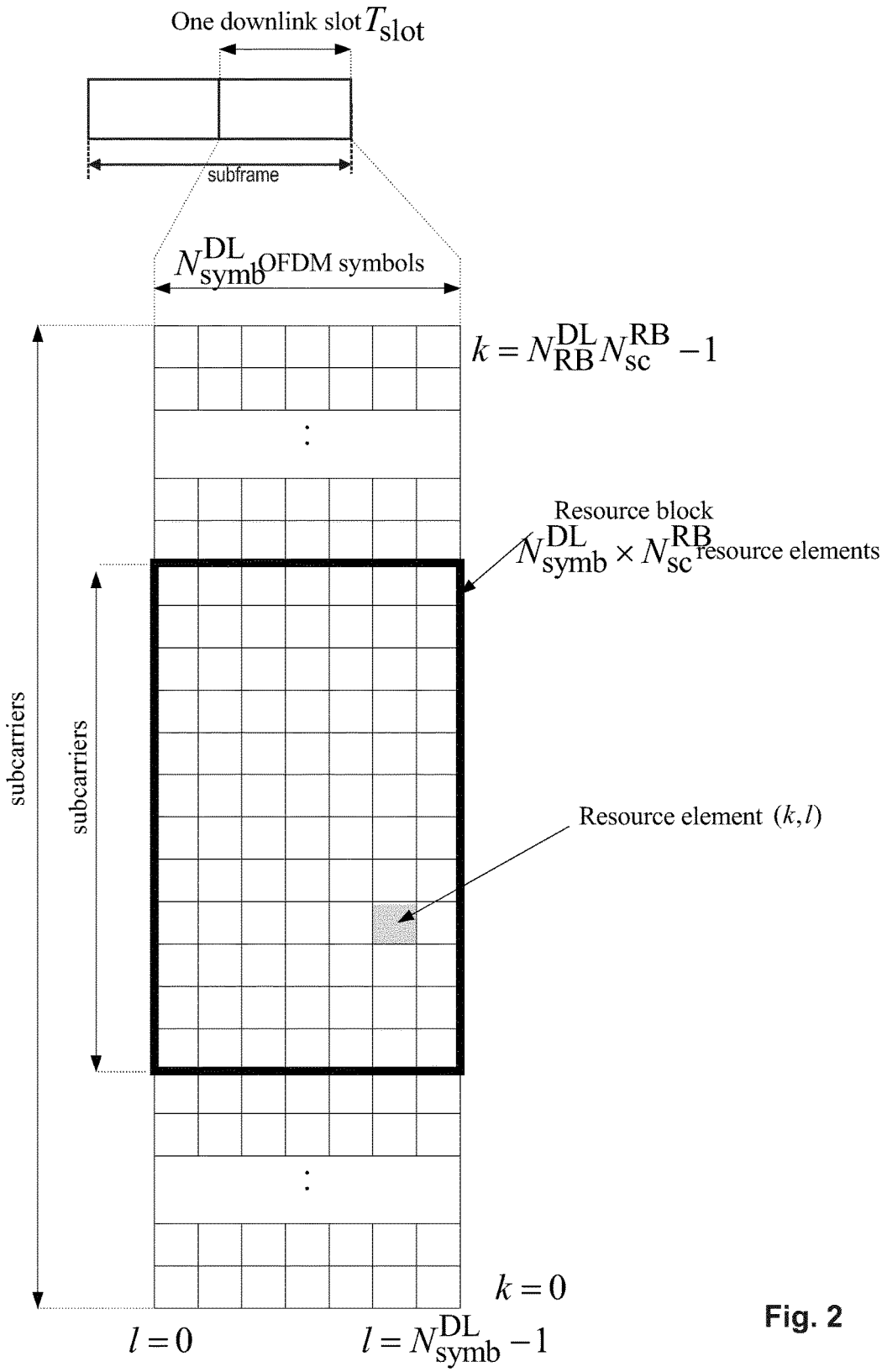
FIG. 2 shows an exemplary downlink resource grid of a downlink slot of a subframe as defined for 3GPP LTE (Release 8/9)
Figure 3:
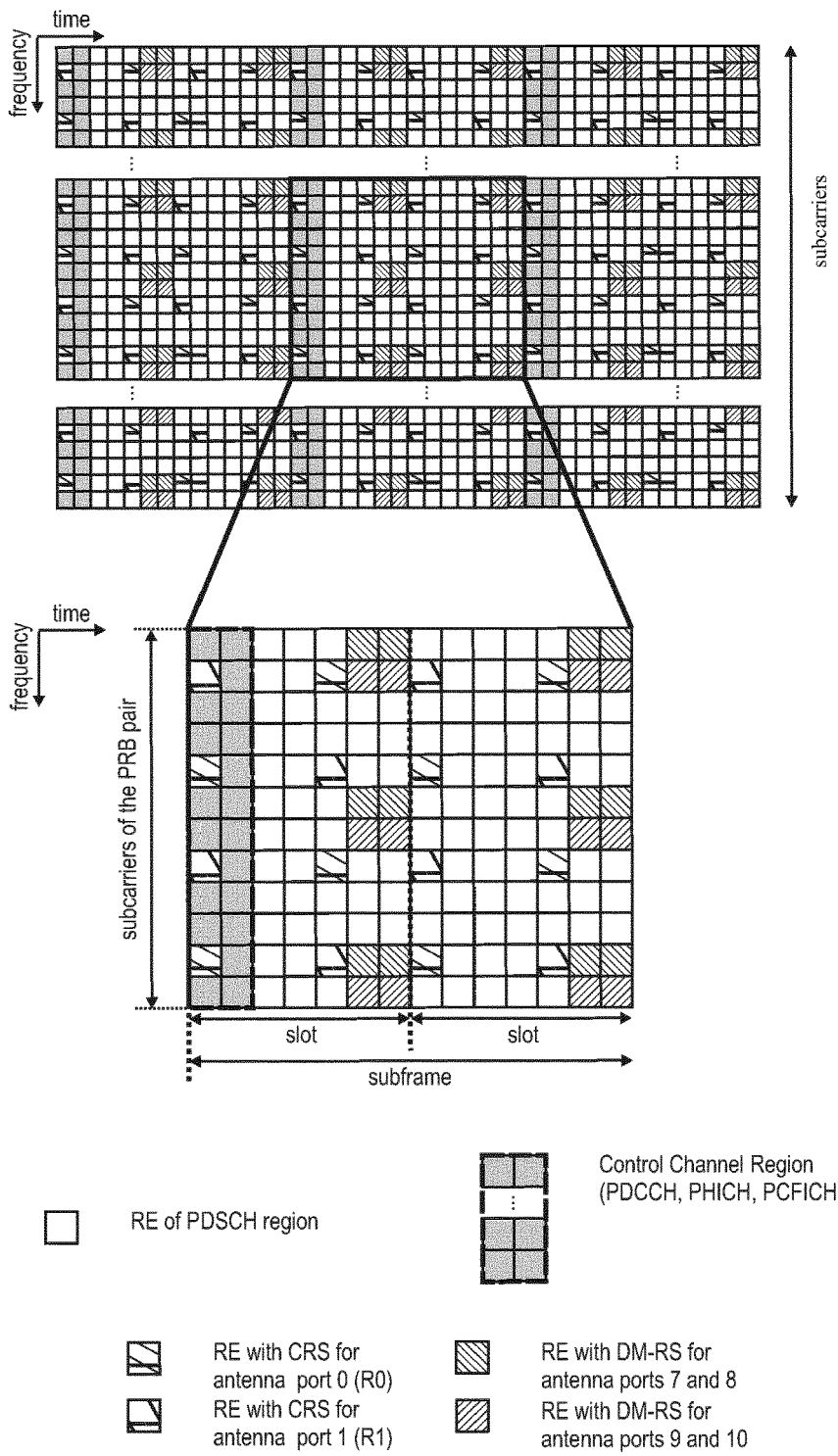
FIG. 3 shows exemplary subframe boundaries on a downlink component carrier as defined for 3GPP LTE (Release 8/9), including the PDCCH, PDSCH, CRS.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

The term "subframe boundaries" as used in the set of claims and in the application is to be understood broadly as the points in time given by a subframe pattern/timing where a normal full subframe can start (and end). So far, in LTE, a subframe is the smallest unit that eNB can schedule a UE. The subframe pattern/timing is usually controlled by the eNodeB. A UE wishing to access an eNodeB needs to acquire the subframe timing (e.g., by performing cell search procedure). Only when the UE is synchronized with the eNodeB on the subframe timing, the UE knows when to perform e.g., the blind-decoding of the (E)PDCCH.

The term "set of control signal candidates" as used in the set of claims and in the application shall be understood broadly as a set comprising several candidates (time-frequency resources) that may carry a control signal from the radio base station. For each subframe, each UE and the radio base station have control signal candidates configured between them such that the radio base station can transmit a control signal to the UE when appropriate. The UE, in turn, by blind decoding (all of) the control signal candidates will be able to retrieve the control signal. The set of control signal candidates can also be called "search space". According to the 3GPP implementation, the control signal candidates are configured in terms of aggregation levels (number of combined resource elements to transmit a control signal) and the number of different control signal candidates per aggregation level. For instance, in a 3GPP implementation, the sum of the values of parameter $M^{(L)}$ for all aggregation levels can be seen as the number of control signal candidates for a corresponding set.

As explained in the background section, 3GPP is currently in the process of introducing the possibility of using partial subframes for licensed-assisted access (LAA). Although some agreements have been achieved already, no agreements could yet be achieved for some important issues in said respect. Furthermore, it is apparent that the LTE specification for supporting partial subframes in unlicensed bands will require several changes compared to the current specification that is limited to licensed band operations.

Furthermore, although partial subframes are at the moment foreseen for only unlicensed bands (LAA operation), in the future the concept of supporting partial subframes may also be applied to other scenarios, e.g., licensed bands. Consequently, although the present application will mainly focus on LAA scenarios to facilitate explaining the concepts, the invention is actually not limited thereto. Rather, the concepts devised for the invention are also applicable to non-LAA scenarios where partial subframes are supported.

As explained above in the detailed background section, the UE and eNodeB may support the transmission of partial subframes (in addition to full subframes) so as to maximize data throughput and resource usage in the radio cell(s). A scenario where partial subframes are used was presented in the background section for example in connection with FIG. 12 or 13, respectively assuming two and four starting positions.

One important question is however how the UE knows where/when the partial subframe starts. Another issue relates to the fact that by using partial subframes, less resources are available for the PDSCH transmission in the partial subframe. One aim should still be to maximize the resource usage for partial subframes.

One possible way to solve one of these problems is that the UE shall perform blind decoding of the PDCCH (or EPDCCH) at each of the supported starting positions. Put differently, a set of PDCCH candidates can be configured for the UE to monitor so as to receive PDCCH(s) from the eNodeB, these additional sets of PDCCH candidates being configured e.g., in a corresponding manner as already done for the first starting position at the subframe boundaries as explained in the background section. By having the UE monitor search spaces at each possible starting position, the eNodeB thus can decide to transmit data using a partial subframe which starts at any of the preconfigured starting positions for which the UE monitors the PDCCH candidates.

Figure 16:
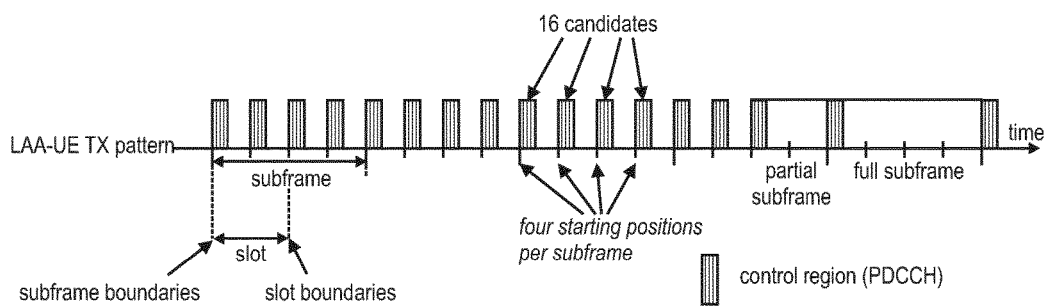
FIG. 16 illustrates the control region and blind decoding opportunities at the UE for a scenario supporting partial subframes at four different positions per subframe duration, when PDCCH is assumed for carrying the control signals.

FIG. 16 illustrates this approach for a scenario where four starting positions are defined per subframe duration (i.e., between two subsequent subframe boundaries). As can be seen from said figure, a control region is assumed for each starting position where the eNodeB can transmit PDCCHs (resource assignments) to the UE. Accordingly, if the UE successfully decodes the PDCCH in the set of PDCCH candidates at one of the starting position, the UE can assume that the partial subframe starts from that position. Based on the successfully-decoded PDCCH, the UE can then continue e.g., to receive the data in the data region of the partial subframe (PDSCH). Due to the low error probability of the PDCCH blind decoding, this approach is reliable to detect the start of a partial subframe.

In the exemplary solution of FIG. 16 it is assumed that basically the same search space is defined for the additional starting positions as for the first starting position (i.e., at the subframe boundary). Accordingly, when assuming a search space for the UE with 16 PDCCH candidates (e.g., for the UE-specific search space and all aggregation levels, see Table 2), also the same amount of PDCCH candidates must be blind decoded for the remaining starting positions so as to determine whether a partial subframe is transmitted by the eNodeB or not.

However, this approach also has disadvantages. The amount of PDCCH candidates to be blind decoded by a UE increases linearly with the number of starting positions within a subframe. Consequently, the UE has to decode more candidates within the same amount of time which increases the complexity and power usage. Furthermore, in case of PDCCH, it is possible that the UE can finish decoding the former PDCCH before the latter PDCCH. Then, the PDCCH decoding process can be reused. However, if the interval between each starting position is short, the PDCCH blind decoding at each of the starting positions may not be even achieved. Also, the PDSCH decoding is delayed, since more PDCCH candidates have to be decoded before the PDSCH can be decoded. In case of EPDCCH, the UE has to wait until the end of the subframe to start decoding the EPDCCH. If the number of EPDCCH blind decoding increases, the time needed for the EPDCCH decoding is increased, which results in PDSCH decoding delay. Finally, the PDCCH false alarm probability increases with increasing number of PDCCH candidates to be blind decoded by the UE. As a result, assuming e.g., an uplink grant is false detected by the UE, unnecessary uplink data might be transmitted by the UE, causing unnecessary interference on UL transmissions scheduled to other UEs in the cell.

Figure 6:
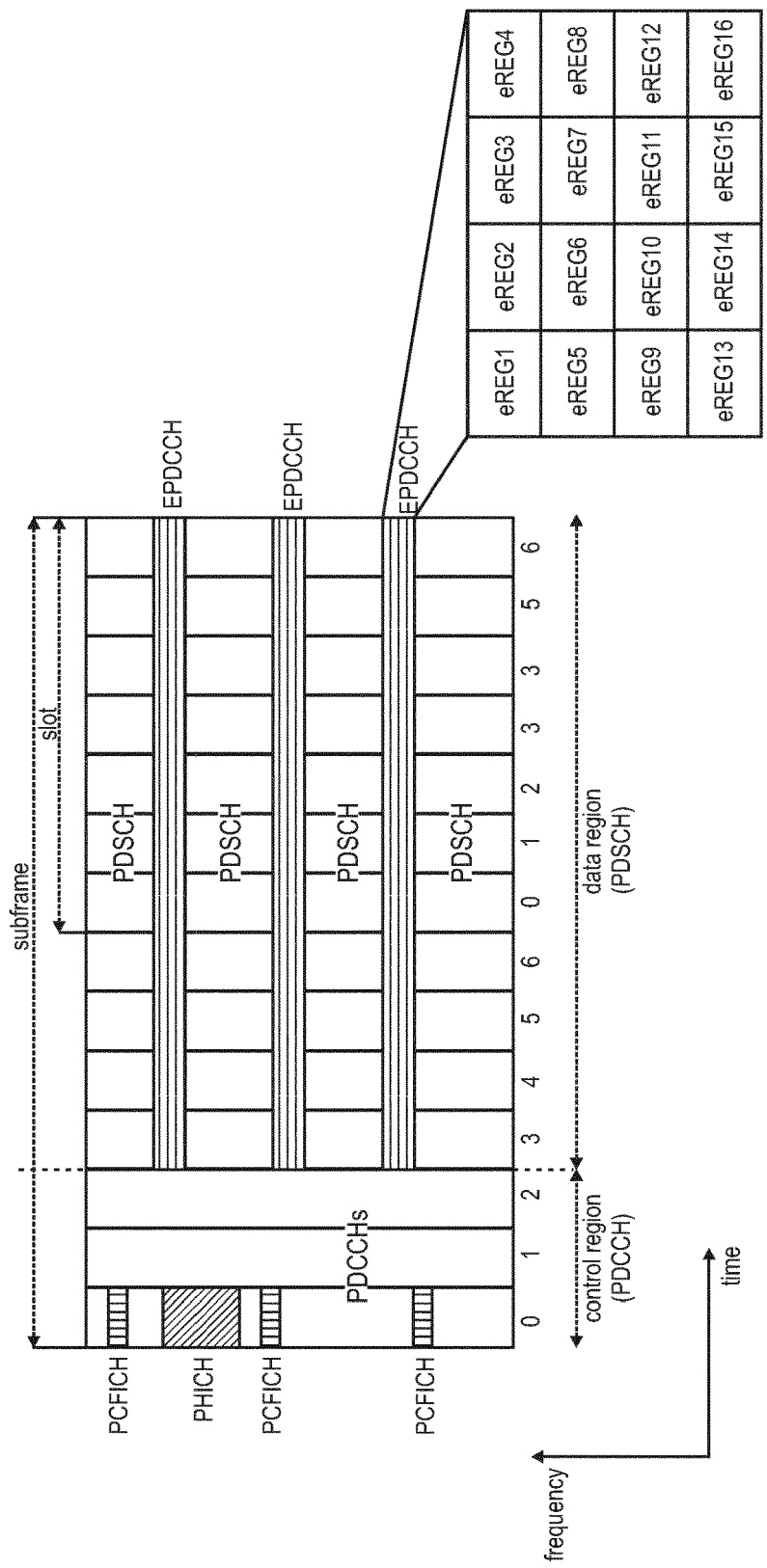
FIG. 6 illustrates the subframe structure including the PDCCH, PCFICH, PHICH, PDSCH and EPDCCH.
Figure 9:
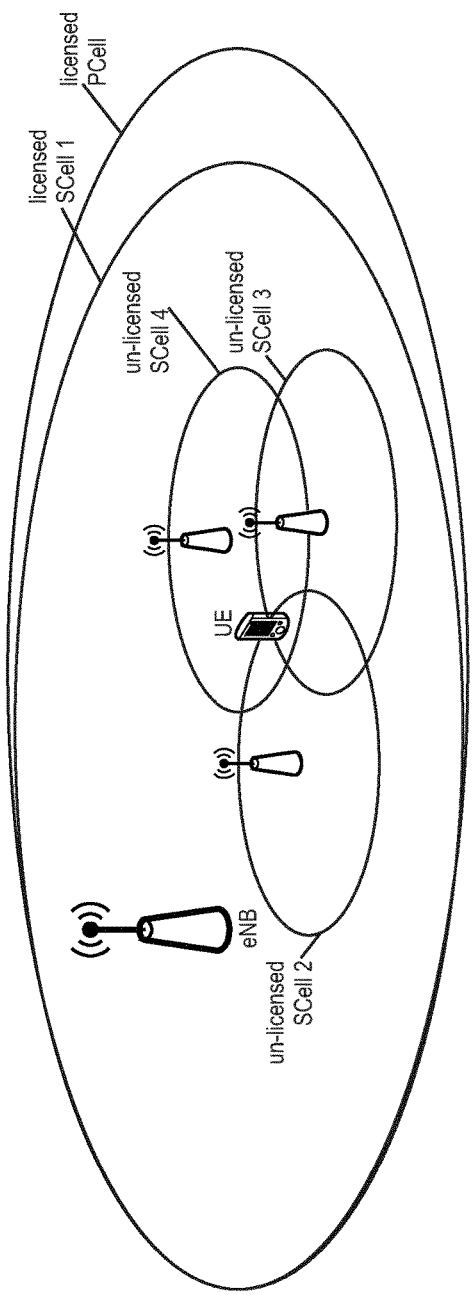
FIG. 9 illustrates an exemplary LAA scenario with several licensed und unlicensed cells.
Figure 10:
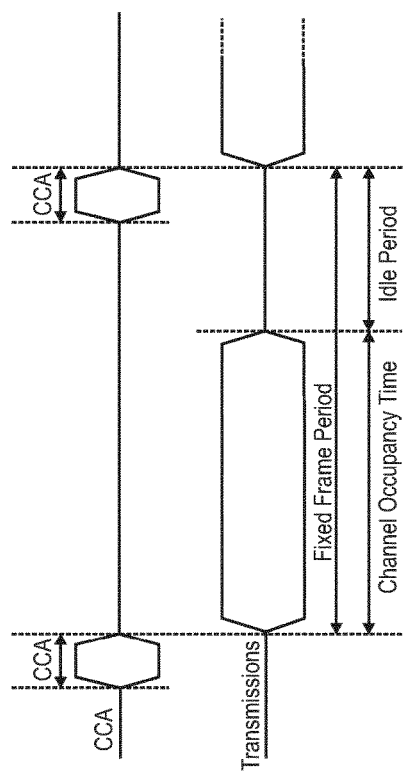
FIG. 10 illustrates the transmission behavior for an LAA transmission.
Figure 11:
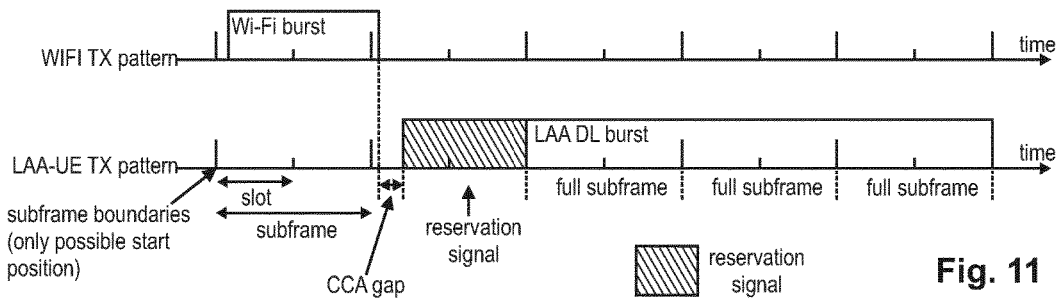
FIG. 11 illustrates the timing between a Wi-Fi transmission and LAA UE downlink burst for an unlicensed cell.

The above approach has now been described mainly on the basis of the PDCCH. However, this approach applies in a corresponding manner to scenarios where control signals are transmitted by the eNodeB within the EPDCCH control region of a subframe (see FIG. 6, and corresponding description in the background section).

Figure 17:
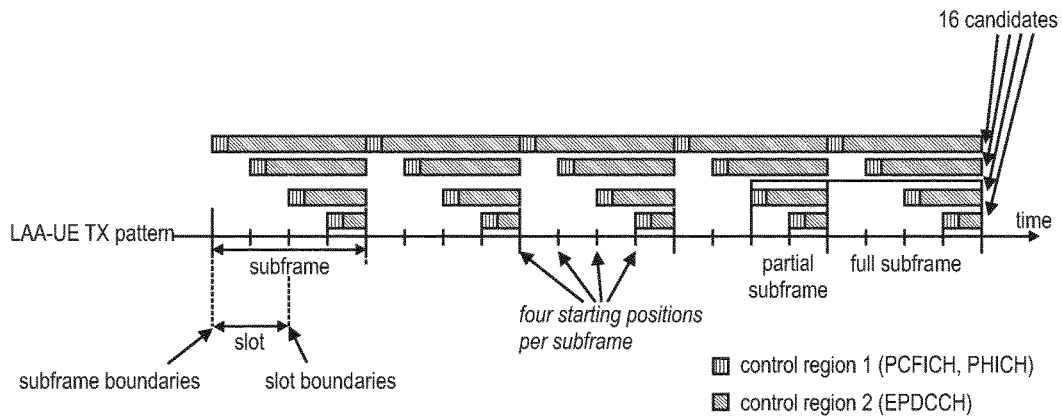
FIG. 17 illustrates the control region and blind decoding opportunities at the UE for a scenario supporting partial subframes at four different positions per subframe duration, when EPDCCH is assumed for carrying the control regions.

FIG. 17 illustrates the approach in a scenario where the EPDCCH is used by an eNodeB. As apparent, two control regions are assumed, the first control region at the beginning of the partial/full subframe that can be used to transmit the PCFICH and PHICH (if necessary), while the EPDCCH control region is used to transmit the (E)PDCCHs. Again, for an exemplary scenario of four possible starting positions for the partial subframes, it is assumed that the same search space preconfigured for the first starting position (first subframe boundary) is also preconfigured for the remaining three starting positions. In particular, a search space for the UE of 16 (E)PDCCH candidates is assumed for the first position; e.g., in the same manner as described in the background section in Table 8 assuming an EPDCCH set of 8 PRBs (i.e., $N_{RB}^{Xp}=8$), Case 2 across all aggregation levels 1, 2, 4, and 8, i.e., adding 6+6+2+2=16. The same can be applied to the remaining starting positions, as illustrated in FIG. 17. However, the EPDCCH approach suffers the same disadvantages as discussed with regard to the PDCCH solution of FIG. 16.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in these particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel. 12/13) environment. The various embodiments mainly allow for an improved blind decoding mechanism implemented in scenarios (e.g., LAA) where partial subframes are supported. Other functionality (i.e., functionality not changed by the various embodiments) however may remain exactly the same as explained in the background section or may be changed without any consequences to the various embodiments.

First Embodiment

In the following a first embodiment for solving the above problem(s) will be described in detail. Different implementations of the first embodiment will be explained in detail below. In the following, the first embodiment will be explained by using the following exemplary scenario, devised to easily explain the principles of the embodiment. The principles however can also be applied to other scenarios, some of which will be explicitly mentioned in the following.

Figure 12:
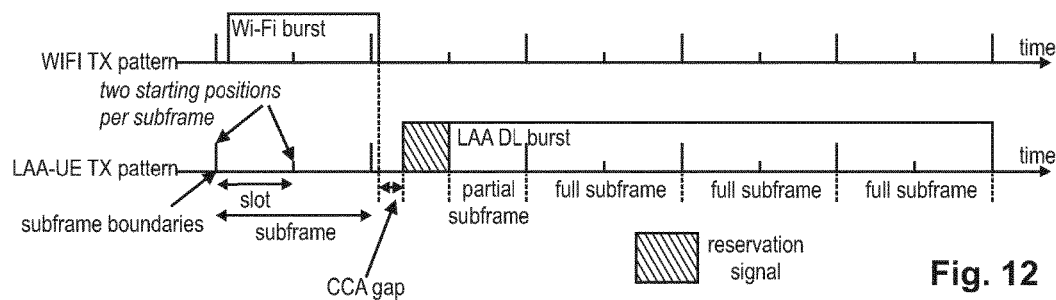
FIG. 12 illustrates the timing between a Wi-Fi transmission and LAA UE downlink burst for an unlicensed cell for a partial subframe scenario, assuming two possible starting positions.
Figure 13:
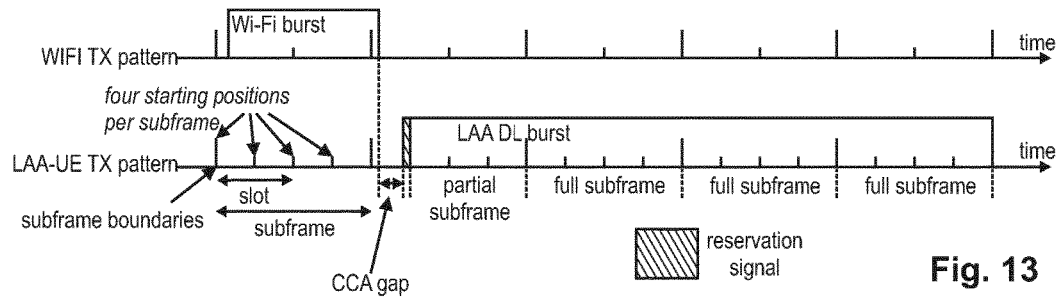
FIG. 13 illustrates the timing between a Wi-Fi transmission and LAA UE downlink burst for an unlicensed cell for a partial subframe scenario, assuming four possible starting positions.
Figure 14:
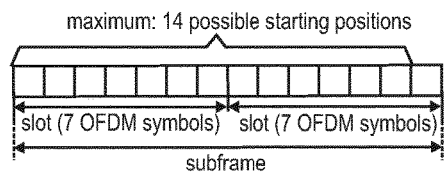
FIG. 14 illustrates the 14 theoretically possible starting positions of a partial subframe.
Figure 15:
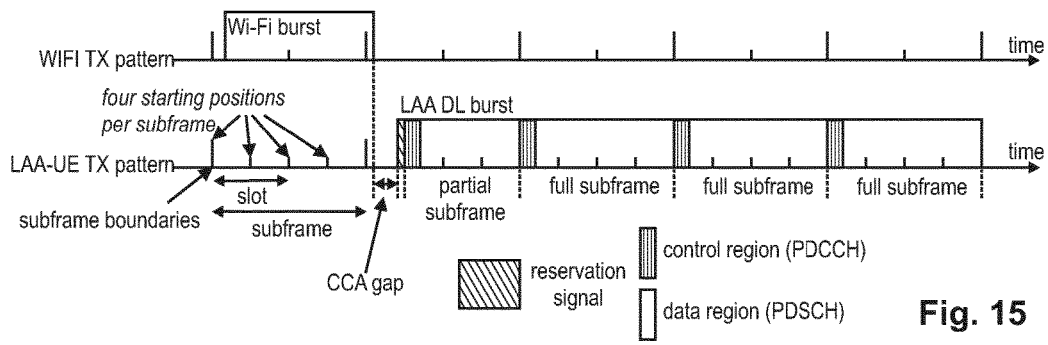
FIG. 15 is similar to FIG. 13, however additionally illustrating the control region and data region of the partial and full subframes.

As explained in the background section, 3GPP is planning to enhance current systems by supporting partial subframes, which give the eNodeB more flexibility e.g., allowing the eNodeB to start the data transmission not only at the subframe boundaries but also at particular additional starting positions within the subframe boundaries, such as the slot boundary as illustrated in FIG. 12 or even further starting positions as illustrated in FIG. 13. In the following, although more starting positions may be possible, the exemplary scenarios used to explain the embodiment will assume for ease of explanation for each subframe either two starting positions in total (the subframe boundaries and e.g., the slot boundaries) or four starting positions in total (the subframe boundaries, the slot boundaries and two further starting positions; see e.g., FIG. 13).

3GPP has so far not yet decided on many details of how partial subframes are configured. It can be assumed that the eNodeB can decide for its radio cell whether partial subframes shall be supported or not, and if so, the position and number of subframe starting positions may be decided by the eNodeB or may be preconfigured (e.g., fixed in the specification). Corresponding information thereon can be provided to the user equipments in the cell by using for instance the system information broadcast or UE-specific messages such as RRC signaling. In any case, the system shall be set up such that the UE and the eNodeB both are on the same terms as to whether and which partial subframes are supported or not.

In said connection, the physical downlink control channel structure is configured not only for the subframe boundaries as already known from the prior art, but also for the additional intra-subframe starting positions provided to make full use of the partial subframes. Currently, the physical downlink control channel is mainly configured for the first starting position (subframe boundaries) as was explained in detail in the background section making reference to corresponding 3GPP standards such as TS 36.213. This involves amongst many other things the definition of the UE-specific search space with corresponding aggregation levels (e.g., 1, 2, 4, 8 for PDCCH) and a number of PDCCH candidates $M^{(L)}$ per aggregation level. Please note that the scenario where control channel signaling is provided by the EPDCCH will be explained later.

In a similar manner, the physical downlink control channel shall also be configured for the additional starting positions configured for the UE to support partial subframes. In particular, the eNodeB may decide on the set of PDCCH candidates that shall be configured respectively for each of the additional starting positions. In a similar manner as for the first starting position, for each further starting position one or more aggregation levels can be supported, respectively having one or more PDCCH candidates. According to the first embodiment, the number of PDCCH candidates for at least one of the later starting positions shall however be reduced compared to the number of PDCCH candidates configured for the first starting position (i.e., the subframe boundaries).

For example, in a scenario with two starting positions in total for each subframe, the corresponding search space and PDCCH candidates can be configured by the eNB as follows:

TABLE 16

PDCCH candidates for two starting positions

| Starting position | Search space $S_k^{(L)}$ | | Number of PDCCH candidates $M^{(L)}$ | Total number of PDCCH candidates per position |
|---|---|---|---|---|
| | Aggregation level L | Size [in CCEs] | | |
| First starting position | 1 | 6 | 6 | 16 |
| | 2 | 12 | 6 | |
| | 4 | 8 | 2 | |
| | 8 | 16 | 2 | |
| Second starting position | 1 | 3 | 3 | 8 |
| | 2 | 6 | 3 | |
| | 4 | 4 | 1 | |
| | 8 | 8 | 1 | |

Figure 18:
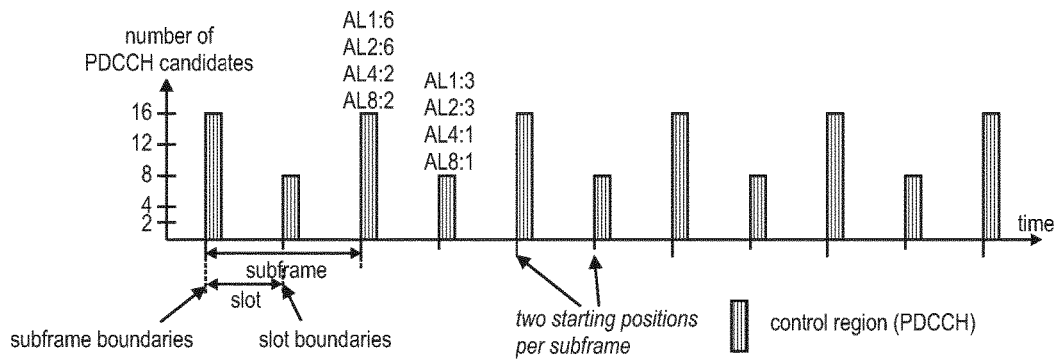
FIG. 18 illustrates the control regions and blind decoding opportunities at the UE for a scenario supporting partial subframes at two different positions per subframe duration, when PDCCH is assumed for carrying the control regions, according to the one exemplary implementation of the first embodiment.

This is correspondingly illustrated in FIG. 18, which shows a scenario with two possible starting positions per subframe and the number of PDCCH candidates on the y-axis. The figure additionally lists the configured aggregation levels and PDCCH candidates per aggregation level for both starting positions for the second illustrated subframe (see also Table 16), which of course applies to all the other subframes as well. As apparent therefrom, instead of providing the same amount of PDCCH candidates as for the first starting position, this configuration only provides half of the PDCCH candidates for a partial subframe starting at the slot boundary.

Similarly, for the case of four starting positions in total, the following PDCCH candidates can be exemplarily configured according to the following table:

TABLE 17

PDCCH candidates for four starting positions

| | Search space $S_k^{(L)}$ | | Number of PDCCH candidates $M^{(L)}$ | Total number of PDCCH candidates per position |
|---|---|---|---|---|
| Starting position | Aggregation level L | Size [in CCEs] | | |
| First starting position | 1 | 6 | 6 | 16 |
| | 2 | 12 | 6 | |
| | 4 | 8 | 2 | |
| | 8 | 16 | 2 | |
| Second starting position | 1 | 3 | 3 | 8 |
| | 2 | 6 | 3 | |
| | 4 | 4 | 1 | |
| | 8 | 8 | 1 | |
| Third starting position | 1 | 2 | 2 | 4 |
| | 2 | 4 | 2 | |
| Fourth starting position | 1 | 1 | 1 | 2 |
| | 2 | 2 | 1 | |

Figure 19:
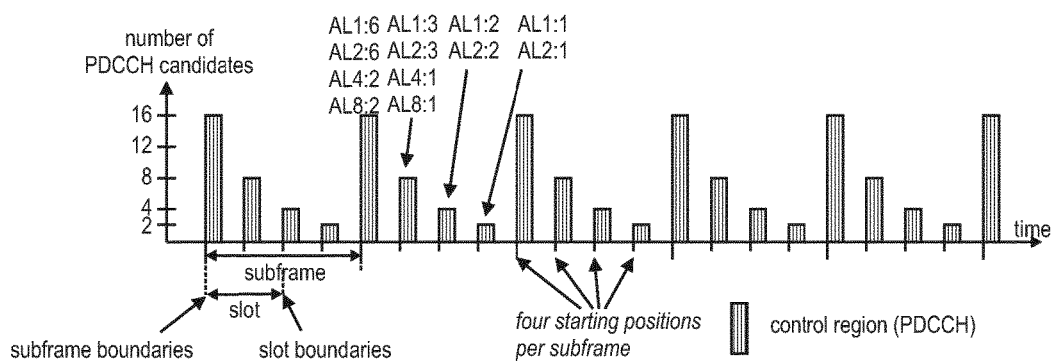
FIGS. 19 and 20 illustrates the control regions and blind decoding opportunities at the UE for a scenario supporting partial subframes at four different positions per subframe duration, when PDCCH is assumed for carrying the control regions, according to other exemplary implementations of the first embodiment.

This is exemplarily illustrated in FIG. 19, which shows a scenario with four possible starting positions per subframe and a corresponding number of PDCCH candidates on the y-axis for each starting position. The figure additionally lists the configured aggregation levels and PDCCH candidates per aggregation level for all four starting positions for the second illustrated subframe (see also Table 17), which of course applies to all the other subframes as well. As apparent therefrom, the number of PDCCH candidates diminishes with each starting position such that the later the starting position the less PDCCH candidates the starting position has configured.

Figure 20:
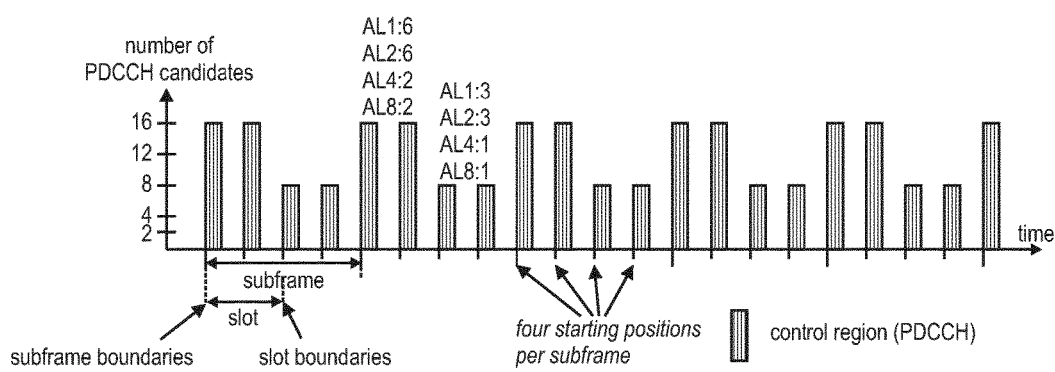

Another possible configuration for the different sets of PDCCH candidates for a scenario with four starting positions is given in the following table and illustrated in FIG. 20.

TABLE 18

PDCCH candidates for four starting positions

| | Search space $S_k^{(L)}$ | | Number of PDCCH candidates $M^{(L)}$ | Total number of PDCCH candidates per position |
|---|---|---|---|---|
| Starting position | Aggregation level L | Size [in CCEs] | | |
| First starting position | 1 | 6 | 6 | 16 |
| | 2 | 12 | 6 | |
| | 4 | 8 | 2 | |
| | 8 | 16 | 2 | |
| Second starting position | 1 | 6 | 6 | 16 |
| | 2 | 12 | 6 | |
| | 4 | 8 | 2 | |
| | 8 | 16 | 2 | |
| Third starting position | 1 | 3 | 3 | 8 |
| | 2 | 6 | 3 | |
| | 4 | 4 | 1 | |
| | 8 | 8 | 1 | |

TABLE 18-continued

PDCCH candidates for four starting positions

| | Search space $S_k^{(L)}$ | | Number of PDCCH candidates $M^{(L)}$ | Total number of PDCCH candidates per position |
|---|---|---|---|---|
| Starting position | Aggregation level L | Size [in CCEs] | | |
| Fourth starting position | 1 | 3 | 3 | 8 |
| | 2 | 6 | 3 | |
| | 4 | 4 | 1 | |
| | 8 | 8 | 1 | |

The above discussed tables and figures shall only be understood as examples of different sets of PDCCH candidates and of course many other possibilities can be foreseen.

Information on the particular sets of PDCCH candidates which are configured between the eNodeB and the UE is provided by the eNodeB to the UE in a suitable manner. For instance, this may be done during initial connection setup, e.g., during the RRC connection procedure, or when adding or activating an unlicensed cell. The set of PDCCH candidates could also be preconfigured (e.g., fixed by the specification).

Therefore, corresponding sets of PDCCH candidates are configured between the eNodeB and the UE for the control channel transmission. In particular, this means from eNodeB perspective that each of the configured PDCCH candidates for each of the starting positions can be used to transmit a PDCCH to the UE. On the other hand, this means from UE perspective that the UE will have to blind decode PDCCH candidates not only for the first starting position but also for the remaining starting positions so as to possibly receive a PDCCH transmission from the eNodeB.

Consequently, by blind decoding all possible PDCCH candidates for each of the starting positions it is possible for the UE to determine whether and when a full/partial subframe (and the corresponding control and user data) transmitted by the eNodeB starts. Furthermore, in view of that the number of PDCCH candidates for later starting positions within the subframe duration is reduced, the total number of PDCCH blind decoding to be performed at the UE within a subframe duration does not increase too much when supporting partial subframes. As a result, the increase of the UE complexity, processing power, the delay for PDSCH decoding as well as the false alarm probability for the PDCCH decoding process when supporting partial subframes stays at a tolerable level; particularly in view of the advantages achieved by supporting partial subframes.

The above has been described for a scenario using the PDCCH control region to transmit the control signals (e.g., PDCCH). In the following, the principles of the first embodiment will now be applied to a scenario using the EPDCCH as explained exemplary in the background section. In particular, the enhanced PDCCH is transmitted in the PDSCH region of each subframe, in addition to other control channels in the control region of each subframe (see FIG. 6). The EPDCCH control region and search space for the first starting position (the subframe boundaries) can be configured as usual according to 3GPP. For instance, as explained in the corresponding background section and the 3GPP standard 36.213 (see also FIG. 17), one localized EPDCCH set is assumed exemplarily (Table 8 above) with a PRB size of 8 PRBs and Case 2, such that 16 EPDCCH candidates in total are provided for the first starting position (i.e., AL1: 6, AL2:6, AL4: 2, AL8:2).

This table can then be extended for the first embodiment as follows, first assuming a scenario with two starting positions, as exemplarily illustrated in FIG. 21. FIG. 21 assumes a EPDCCH set of 8 PRBs and Case 2, such that for the second position a set of EPDCCH candidates is configured where the UE has to monitor 8 EPDCCH candidates (AL1:3, AL2: 3, AL4: 1, AL8:1) compared to 16 EPDCCH candidates monitored at the first starting position (i.e., subframe boundaries).

TABLE 19

EPDCCH candidates monitored by a UE (One Localized EPDCCH-PRB-set - Case 1, Case 2); two starting positions

| | | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|---|
| Starting position | $N_{RB}^{Xp}$ | L = 2 | L = 4 | L = 8 | L = 16 | Total EPDCCH candidates | L = 1 | L = 2 | L = 4 | L = 8 | Total EPDCCH candidates |
| First starting position | 2 | 4 | 2 | 1 | 0 | 7 | 4 | 2 | 1 | 0 | 7 |
| | 4 | 8 | 4 | 2 | 1 | 15 | 8 | 4 | 2 | 1 | 15 |
| | 8 | 6 | 6 | 2 | 2 | 16 | 6 | 6 | 2 | 2 | 16 |
| Second starting position | 2 | 3 | 2 | 1 | 0 | 6 | 3 | 2 | 1 | 0 | 6 |
| | 4 | 4 | 2 | 1 | 1 | 8 | 4 | 2 | 1 | 1 | 8 |
| | 8 | 3 | 3 | 1 | 1 | 8 | 3 | 3 | 1 | 1 | 8 |

TABLE 20

EPDCCH candidates monitored by a UE (One Localized EPDCCH-PRB-set - Case 3); two starting positions

| | | Number of EPDCCH candidates $M_p^{(L)}$ for Case 3 | | | | |
|---|---|---|---|---|---|---|
| Starting position | $N_{RB}^{Xp}$ | L = 1 | L = 2 | L = 4 | L = 8 | Total EPDCCH candidates |
| First starting position | 2 | 8 | 4 | 2 | 1 | 15 |
| | 4 | 6 | 6 | 2 | 2 | 16 |
| | 8 | 6 | 6 | 2 | 2 | 16 |
| Second starting position | 2 | 4 | 2 | 1 | 1 | 8 |
| | 4 | 3 | 3 | 1 | 1 | 8 |
| | 8 | 3 | 3 | 1 | 1 | 8 |

TABLE 21

EPDCCH candidates monitored by a UE (One Localized EPDCCH-PRB-set - Case 1, Case 2); four starting positions

| | | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|---|
| Starting position | $N_{RB}^{Xp}$ | L = 2 | L = 4 | L = 8 | L = 16 | Total EPDCCH candidates | L = 1 | L = 2 | L = 4 | L = 8 | Total EPDCCH candidates |
| First starting position | 2 | 4 | 2 | 1 | 0 | 7 | 4 | 2 | 1 | 0 | 7 |
| | 4 | 8 | 4 | 2 | 1 | 15 | 8 | 4 | 2 | 1 | 15 |
| | 8 | 6 | 6 | 2 | 2 | 16 | 6 | 6 | 2 | 2 | 16 |
| Second starting position | 2 | 3 | 2 | 1 | 0 | 6 | 3 | 2 | 1 | 0 | 6 |
| | 4 | 4 | 2 | 1 | 1 | 8 | 4 | 2 | 1 | 1 | 8 |
| | 8 | 3 | 3 | 1 | 1 | 8 | 3 | 3 | 1 | 1 | 8 |
| Third starting position | 2 | 2 | 2 | 0 | 0 | 4 | 2 | 2 | 0 | 0 | 4 |
| | 4 | 2 | 2 | 0 | 0 | 4 | 2 | 2 | 0 | 0 | 4 |
| | 8 | 2 | 2 | 0 | 0 | 4 | 2 | 2 | 0 | 0 | 4 |
| Fourth starting position | 2 | 1 | 1 | 0 | 0 | 2 | 1 | 1 | 0 | 0 | 2 |
| | 4 | 1 | 1 | 0 | 0 | 2 | 1 | 1 | 0 | 0 | 2 |
| | 8 | 1 | 1 | 0 | 0 | 2 | 1 | 1 | 0 | 0 | 2 |

Furthermore, when assuming a partial subframe scenario where four possible starting positions are possible for a subframe, the following tables can be used for configuring the various sets of EPDCCH candidates. Again, an EPDCCH set with 8 PRBs and Case 2 is assumed. As apparent from the tables and corresponding FIG. 22, the higher aggregation levels are no longer supported for the third and fourth starting positions, thereby substantially reducing the number of EPDCCH candidates for later starting positions.

TABLE 22

EPDCCH candidates monitored by a UE (One Localized
EPDCCH-PRB-set - Case 3); four starting positions

| Starting position | $N_{RB}^{Xp}$ | L = 1 | L = 2 | L = 4 | L = 8 | Total EPDCCH candidates |
|---|---|---|---|---|---|---|
| First starting position | 2 | 8 | 4 | 2 | 1 | 15 |
| | 4 | 6 | 6 | 2 | 2 | 16 |
| | 8 | 6 | 6 | 2 | 2 | 16 |
| Second starting position | 2 | 4 | 2 | 1 | 1 | 8 |
| | 4 | 3 | 3 | 1 | 1 | 8 |
| | 8 | 3 | 3 | 1 | 1 | 8 |
| Third starting position | 2 | 2 | 2 | 0 | 0 | 4 |
| | 4 | 2 | 2 | 0 | 0 | 4 |
| | 8 | 2 | 2 | 0 | 0 | 4 |
| Fourth starting position | 2 | 1 | 1 | 0 | 0 | 2 |
| | 4 | 1 | 1 | 0 | 0 | 2 |
| | 8 | 1 | 1 | 0 | 0 | 2 |

According to a further example, the following tables give an implementation for one distributed EPDCCH PRB set for a partial subframe scenario with four possible subframe starting positions, where FIG. 23 illustrates the case of PRBs=8 and Case 2.

TABLE 23

EPDCCH candidates monitored by a UE (One Distributed EPDCCH-
PRB-set - Case 1, Case 2); four starting positions

| | | Number of EPDCCH candidates $M_p^{(L)}$ for Case 1 | | | | | | Number of EPDCCH candidates $M_p^{(L)}$ for Case 2 | | | | | |
|---|---|---|---|---|---|---|---|---|---|---|---|---|---|
| Starting position | $N_{RB}^{Xp}$ | L = 2 | L = 4 | L = 8 | L = 16 | L = 32 | Total EPDCCH candidates | L = 1 | L = 2 | L = 4 | L = 8 | L = 16 | Total EPDCCH candidates |
| First starting position | 2 | 4 | 2 | 1 | 0 | 0 | 7 | 4 | 2 | 1 | 0 | 0 | 7 |
| | 4 | 8 | 4 | 2 | 1 | 0 | 15 | 8 | 4 | 2 | 1 | 0 | 15 |
| | 8 | 6 | 4 | 3 | 2 | 1 | 16 | 6 | 4 | 3 | 2 | 1 | 16 |
| Second starting position | 2 | 3 | 2 | 1 | 0 | 0 | 6 | 3 | 2 | 1 | 0 | 0 | 6 |
| | 4 | 4 | 2 | 1 | 1 | 0 | 8 | 4 | 2 | 1 | 1 | 0 | 8 |
| | 8 | 3 | 2 | 2 | 1 | 0 | 8 | 3 | 2 | 2 | 1 | 0 | 8 |
| Third starting position | 2 | 2 | 2 | 0 | 0 | 0 | 4 | 2 | 2 | 0 | 0 | 0 | 4 |
| | 4 | 2 | 2 | 0 | 0 | 0 | 4 | 2 | 2 | 0 | 0 | 0 | 4 |
| | 8 | 2 | 2 | 0 | 0 | 0 | 4 | 2 | 2 | 0 | 0 | 0 | 4 |
| Fourth starting position | 2 | 1 | 1 | 0 | 0 | 0 | 2 | 1 | 1 | 0 | 0 | 0 | 2 |
| | 4 | 1 | 1 | 0 | 0 | 0 | 2 | 1 | 1 | 0 | 0 | 0 | 2 |
| | 8 | 1 | 1 | 0 | 0 | 0 | 2 | 1 | 1 | 0 | 0 | 0 | 2 |

TABLE 24

EPDCCH candidates monitored by a UE (One Distributed
EPDCCH-PRB-set - Case 3); four starting positions

| Starting position | $N_{RB}^{Xp}$ | L = 1 | L = 2 | L = 4 | L = 8 | L = 16 | Total EPDCCH candidates |
|---|---|---|---|---|---|---|---|
| First starting position | 2 | 8 | 4 | 2 | 1 | 0 | 15 |
| | 4 | 4 | 5 | 4 | 2 | 1 | 16 |
| | 8 | 4 | 4 | 4 | 2 | 2 | 16 |
| Second starting position | 2 | 4 | 2 | 1 | 1 | 0 | 8 |
| | 4 | 2 | 2 | 2 | 1 | 0 | 7 |
| | 8 | 2 | 2 | 2 | 1 | 1 | 8 |
| Third starting position | 2 | 2 | 2 | 0 | 0 | 0 | 4 |
| | 4 | 2 | 2 | 0 | 0 | 0 | 4 |
| | 8 | 2 | 2 | 2 | 1 | 0 | 5 |
| Fourth starting position | 2 | 1 | 1 | 0 | 0 | 0 | 2 |
| | 4 | 1 | 1 | 0 | 0 | 0 | 2 |
| | 8 | 1 | 1 | 0 | 0 | 0 | 2 |

As can be seen from the above examples, the number of EPDCCH candidates for at least one (in the examples for all) of the partial subframe starting positions is less than the number of the PDCCH candidates for the first starting position.

In the following, further advantageous implementations for several aspects of the first embodiment will be explained in detail.

For example, as apparent from the figures and the background description, partial subframes will most likely be introduced within the LAA framework, so as to account for the non-synchronized transmissions in the unlicensed spectrum by Wi-Fi nodes. Correspondingly, one implementation of the first embodiment shall be applied to such a LAA scenario, where partial subframes will be mainly supported for the unlicensed cells to increase resource usage. Therefore, the above-discussed principles and examples of the first embodiment should be applied to unlicensed cells, i.e., carriers in the unlicensed frequency spectrum. Thus, it is on an unlicensed cell that the various sets of PDCCH candidates are configured, and the UE shall correspondingly monitor the search space of a control region of the unlicensed serving cell to blind decode the PDCCH candidates per starting position.

For instance, it is not yet clear how the blind decoding process should be implemented in the UE for partial subframes. At present, the UE will decode all PDCCH candidates at the subframe boundaries so as to determine whether a control signal was transmitted for the UE or not. However, it is unclear whether the UE shall continue blind decoding the PDCCH candidates for remaining starting positions after having successfully decoded a control signal at a (previous) starting position. For instance, assuming that the UE successfully decodes a PDCCH at the second out of for starting positions for a subframe, the UE will have blind decoded all the PDCCH candidates for the first and second starting positions however might not need to continue the blind decoding process for the third and fourth starting positions. In particular, it is assumed that the eNodeB will start transmitting the data at only one of the four possible starting positions. In other words, the UE might be configured to not continue the blind decoding process for the remaining starting positions upon having successfully decoded a control signal from the eNodeB at the current starting position.

Alternatively, the UE can be configured to continue the blind decoding process for the remaining starting positions even if it has successfully decoded a control signal from the eNodeB at the current starting position. This might be particularly advantageous so as to cope with false detection of control signals. In particular, for cases where the UE erroneously successfully decodes a control signal for itself, not continuing with the blind decoding process will prevent the UE to receive the actual data, if a control signal is indeed transmitted by the eNodeB at a later starting position. Therefore, the UE may continue blind decoding the set of control signal candidates at the remaining starting positions in light of the successfully decode the correct PDCCH. In case UE successfully decodes more than one DL grant, UE would decode corresponding PDSCH according to the decoded DL grants. If UE successfully decode one corresponding PDSCH, UE would ignore other decoded DL grants and regard them as false detection.

According to another advantageous implementation, the control region of a partial subframe can be made shorter than the corresponding control region of a full subframe. In particular, the control region of the PDCCH normally spans a particular number of OFDM symbols at the beginning of the subframe (e.g., 3 OFDM symbols in FIG. 6). According to this implementation, the control region provided for at least one of the partial subframes within each subframe duration is shortened. For instance, the PDCCH region for a full subframe starting at the first starting position can be three OFDM symbols along, while the corresponding PDCCH control region for some or all of the subsequent remaining starting positions may only span one OFDM symbol. The corresponding PCFICH control channel transmitted in the first OFDM symbol of the control region correspondingly indicates the length of the PDCCH control region for the respective starting position. Therefore, the UE will derive from the PCFICH the length of the PDCCH control region.

On the other hand, the control region length for a control region of a partial subframe can also be preconfigured, such that the corresponding PCFICH does not need to be transmitted by the eNodeB. This reduces the CFI detection error and frees the resources normally used to transmit this PCFICH, which e.g., may be used to transmit the PDSCH as will be explained later.

According to another advantageous implementation, the number of blind decoding attempts to pee performed by the UE within each subframe duration shall not be increased by implementing partial subframe support as will be explained in the following. It is assumed that the support of partial subframes may be enabled or disabled e.g., by the eNodeB for particular UE(s). In other words, the eNodeB might decide for each UE whether partial subframes are to be used or not, and will accordingly configure the UE. Correspondingly, two different cases are distinguished for this scenario, namely a control channel configuration when supporting partial subframes and a different control channel configuration when not supporting partial subframes. The eNodeB and UE can toggle between these two configurations depending on whether partial subframes are supported or not. As mentioned before, the principle behind this implementation is that the UE processing for the blind decoding of control signals shall not be increased (i.e., shall not change) when supporting partial subframes. When not supporting partial subframes, the PDCCH configuration can be as explained before in connection with the 3GPP prior art, e.g., having 16 PDCCH candidates configured for the four aggregation levels (see Table 2, FIG. 16). On the other hand when supporting partial subframes, a different PDCCH configuration is used. As apparent from the following table, also the set of PDCCH candidates for the first position will change.

TABLE 25

PDCCH candidates for four starting positions when supporting partial subframes: no increase in blind decoding attempts

| Starting position | Search space $S_k^{(L)}$ | | Number of PDCCH candidates $M^{(L)}$ | Total number of PDCCH candidates per position |
|---|---|---|---|---|
| | Aggregation level L | Size [in CCEs] | | |
| First starting position | 1 | 2 | 2 | 6 |
| | 2 | 4 | 2 | |
| | 4 | 4 | 1 | |
| | 8 | 8 | 1 | |
| Second starting position | 1 | 2 | 2 | 6 |
| | 2 | 4 | 2 | |
| | 4 | 4 | 1 | |
| | 8 | 8 | 1 | |
| Third starting position | 1 | 1 | 1 | 2 |
| | 2 | 2 | 1 | |
| Fourth starting position | 1 | 1 | 1 | 2 |
| | 2 | 2 | 1 | |

Figure 24:
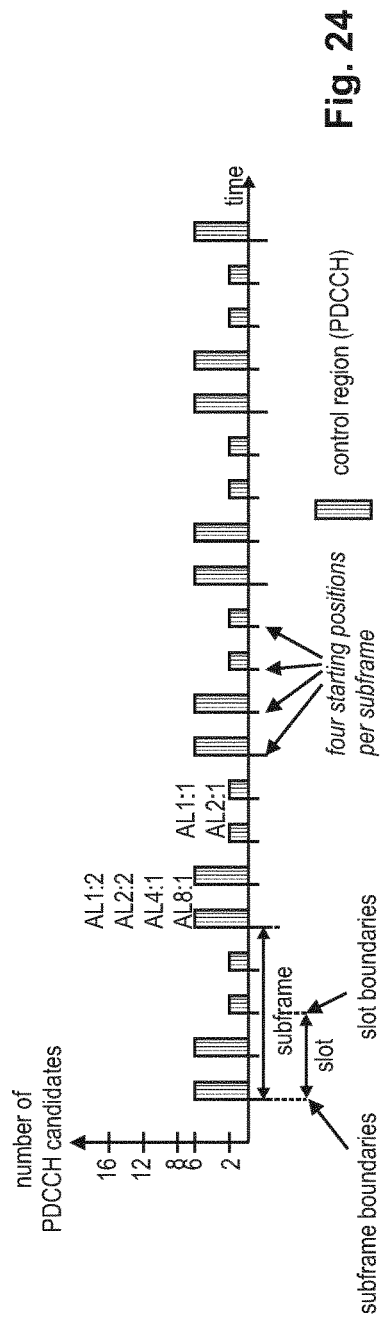
FIGS. 24 and 25 illustrates the control regions and blind decoding opportunities at the UE for a scenario supporting partial subframes at four different positions per subframe duration, respectively when PDCCH or EPDCCH is assumed for carrying the control regions, according to the an exemplary implementation of the first embodiment where the number of (E)PDCCH candidates to be decoded by the UE stay the same when partial subframe are supported or when not.

The just explained exemplary PDCCH configuration when partial subframes are supported is correspondingly illustrated in FIG. 24.

As apparent therefrom, the total number of PDCCH candidates (6+6+2+2) for all the 4 subframes starting position equals the number of PDCCH candidates (16) to be blind decoded by the UE for the only subframe boundary starting position when not supporting partial subframes (see Table 2, UE-specific for all aggregation levels).

The same concept may be applied to the EPDCCH control channel configuration exemplarily illustrated for the case of a localized EPDCCH PRB set and Case 2 and PRB of 8.

TABLE 26

EPDCCH candidates for four starting positions when supporting partial subframes: no increase in blind decoding attempts, One Localized EPDCCH PRB set, Case 2, PRB = 8

| Starting position | Number of EPDCCH candidates $M_p^{(L)}$ for Case 2 | | | | Total EPDCCH candidates |
|---|---|---|---|---|---|
| | L = 1 | L = 2 | L = 4 | L = 8 | |
| First starting position | 2 | 2 | 1 | 1 | 6 |
| Second starting position | 2 | 2 | 1 | 1 | 6 |

TABLE 26-continued

EPDCCH candidates for four starting positions when supporting
partial subframes: no increase in blind decoding attempts,
One Localized EPDCCH PRB set, Case 2, PRB = 8

| Starting position | Number of EPDCCH candidates $M_p^{(L)}$ for Case 2 | | | | Total EPDCCH candidates |
|---|---|---|---|---|---|
| | L = 1 | L = 2 | L = 4 | L = 8 | |
| Third starting position | 1 | 1 | 0 | 0 | 2 |
| Fourth starting position | 1 | 1 | 0 | 0 | 2 |

Figure 25:
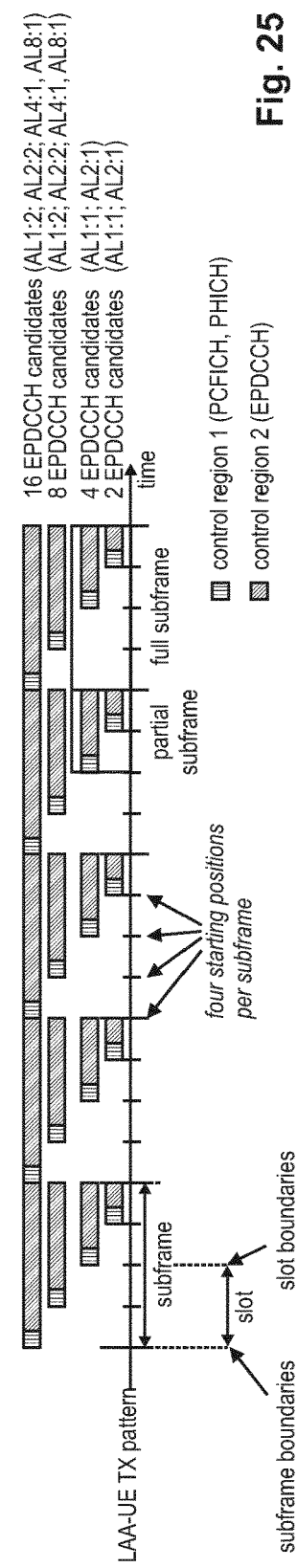

As apparent from this exemplary scenario, the total amount of EPDCCH candidates (6+4+4+2) that is to be blind decoded by the UE for all four subframe starting positions equals the number of EPDCCH candidates (16) to be blind decoded by the UE for the (only) subframe boundary starting position when not supporting partial subframes (see Table 8, last row). The just explained exemplary EPDCCH configuration when subframes are supported is correspondingly illustrated in FIG. 25.

A further example of an EPDCCH control channel configuration is given in the following table for one distributed EPDCCH PRB set, Case 2 and PRB size of 8. The corresponding EPDCCH control channel configuration for one distributed EPDCCH PRB set, Case 2 and PRB size of 8 when no partial subframes are supported is given in Table 6, with a total of 16 EPDCCH candidates.

TABLE 27

EPDCCH candidates for four starting positions when supporting
partial subframes; no increase in blind decoding attempts,
One Distributed EPDCCH PRB set, Case 2, PRB = 8

| Starting position | Number of EPDCCH candidates $M_p^{(L)}$ for Case 2 | | | | | Total EPDCCH candidates |
|---|---|---|---|---|---|---|
| | L = 1 | L = 2 | L = 4 | L = 8 | L = 16 | |
| First starting position | 2 | 2 | 2 | 1 | 1 | 8 |
| Second starting position | 2 | 2 | 1 | 0 | 0 | 5 |
| Third starting position | 1 | 1 | 0 | 0 | 0 | 2 |
| Fourth starting position | 1 | 0 | 0 | 0 | 0 | 1 |

By keeping the blind decoding processing the same for a UE independent from whether partial subframes are supported or not, the UE complexity and processing is not changed.

According to further implementations of the first embodiment, the resource usage for the transmission of the PDSCH data for partial subframes is improved as will be explained in the following. The corresponding explanations are made with reference to FIG. 26, which assumes a scenario where a partial subframes starts at the slot boundary, i.e., at OFDM symbol 7. As apparent from FIG. 26, the PDCCH control region is assumed to be one OFDM symbol long and a PDCCH control signal is transmitted by the illustrated two resource elements.

As was explained in the background section and as was assumed in previous implementations, the PDSCH data region normally starts after the PDCCH control region. According to this implementation however, the PDSCH may start with the same OFDM symbol as the PDCCH, i.e., with the start of the subframe or partial subframe. This is correspondingly illustrated in FIG. 26 where the PDSCH data region spans the complete second slot of the subframe duration.

Furthermore, at the eNodeB the PDSCH shall not be mapped to resource elements that are used by the eNodeB to transmit a PDCCH (i.e., the exemplarily indicated resource elements at sub carrier indices 2 and 9).

Correspondingly, during PDSCH encoding, REs used for PDCCH transmission are not considered available for PDSCH transmission. If there is only one UE scheduled on the partial subframe, only one PDCCH is transmitted on one of the PDCCH candidate. If there are more than one UE scheduled on the partial subframe, more than one PDCCH are transmitted. UE does not know the PDCCH transmitted to another UE. In turn, when UE tries to decode PDSCH, it assumes that all the REs in the control region, except the following REs, such as REs decoded as REs for PDCCH transmission, REs used for transmitting reference signal, and potentially REs used for PCFICH and PHICH transmission, are used for PDSCH transmission. If there are PDCCH for another UE transmitted in the control region, the UE will not know and it will simply cause interference to PDSCH decoding. The starting position of PDSCH for partial subframe can be configurable. eNodeB can indicate in the system broadcast information or UE-specific message when PDSCH starts for partial subframe. One case is that PDSCH starts from the same OFDM symbol as PDCCH, i.e., with the start of the subframe or partial subframe.

Figure 26:
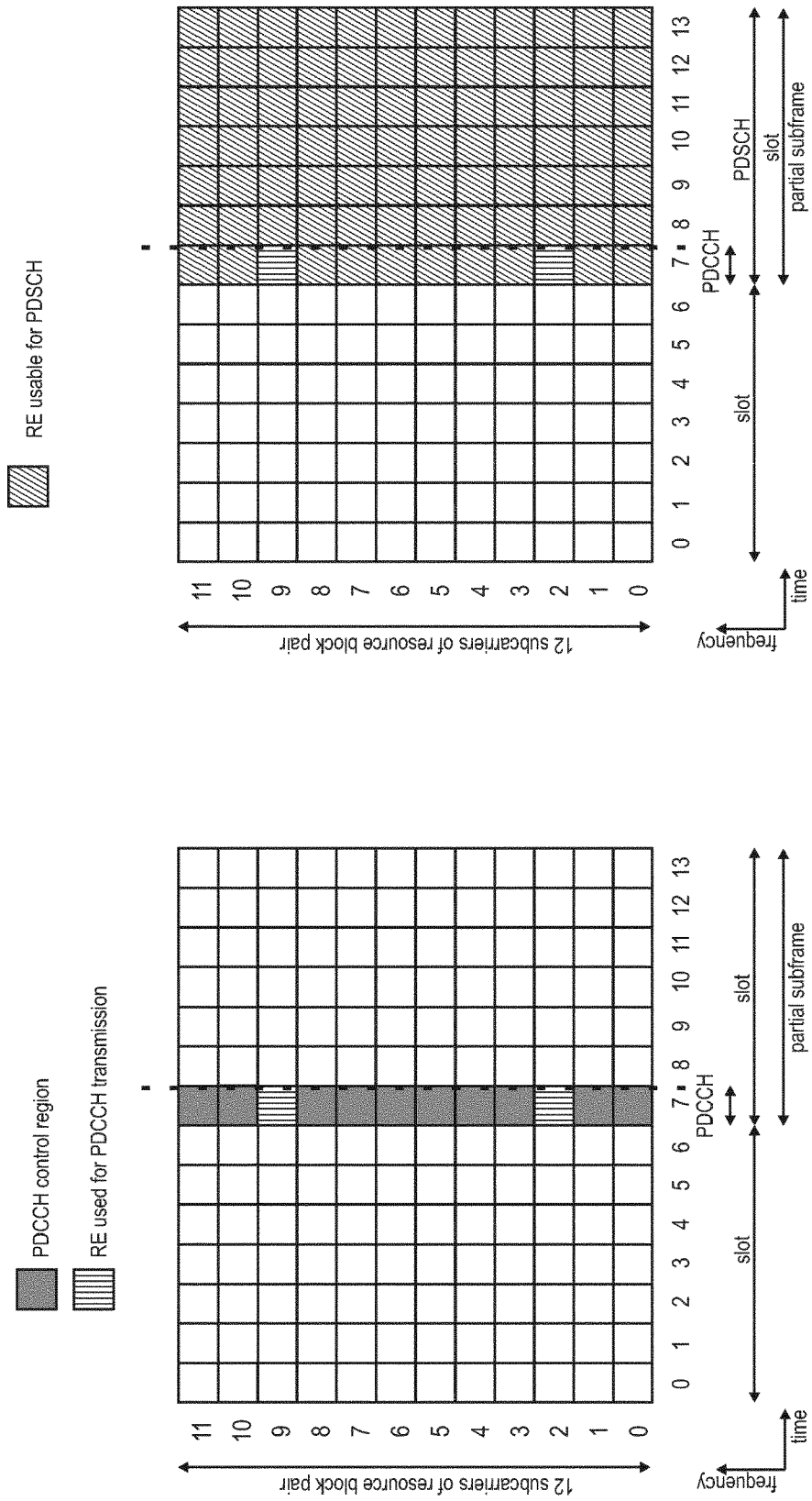
FIG. 26 illustrates a PRB pair for a partial subframe, according to another implementation of the first embodiment where the data region is extended into the control region of a partial subframe.

Although the above explanation and FIG. 26 only refers to the PDCCH control region, a similar improvement can be applied to scenarios where the EPDCCH is used. In particular, when EPDCCH is used, the EPDCCH as well as the PDSCH start from the same OFDMA symbol as the subframe or partial subframe (namely the first OFDM symbol of the partial subframe).

Further Embodiments

According to a first variant, a method is provided for blind decoding control signal candidates that are preconfigured by a radio base station for a user equipment in a control region of each subframe of a radio cell in a mobile communication system so as to be usable by the radio base station to transmit one or more control signals to the user equipment. A plurality of starting positions are preconfigured between two subsequent subframe boundaries, a first starting position being the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The method comprises the following steps performed by the user equipment for each subframe: For at least the first starting position out of the plurality of starting positions, the UE blind decodes the set of control signal candidates preconfigured for that starting position so as to receive the one or more control signals for the subframe.

According to a second variant, provided in addition to the first variant, the user equipment is configured with at least one licensed cell and at least one unlicensed cell. The radio cell is one of the at least one unlicensed cell such that the step of blind decoding is performed by the user equipment for a subframe of the at least one unlicensed cell.

According to a third variant provided in addition to the first or second variant, the sets of control signal candidates are preconfigured such that the number of control signal candidates to be blind decoded by the user equipment at any one of the remaining starting positions is less than the number of control signal candidates to be blind decoded by the user equipment at the first starting position. Optionally, the sets of control signal candidates are preconfigured such that the number of control signal candidates of a set gets less with each next starting position, the number of control signal candidates preconfigured for the first starting position being higher than the number of control signal candidates preconfigured for the next starting position.

According to a fourth variant provided in addition to any of the first to third variants, the step of blind decoding the sets of control signal candidates is performed for each subframe either 1) until the one or more control signals are successfully decoded, or 2) for all starting positions irrespective of whether or not the one or more control signals are successfully decoded.

According to a fifth variant provided in addition to any of the first to fourth variants, the number of control signal candidates for a set of control signal candidates depends on a number of aggregation levels preconfigured for that set and on a number of control signal candidates per aggregation level preconfigured for that set. The number of aggregation levels preconfigured for the at least one further set is less than the number of aggregation levels preconfigured for the first set. In addition, or alternatively, the number of control signal candidates of at least one aggregation level of the at least one further set is less than the number of control signal candidates of the corresponding aggregation level of the first set. The aggregation level defines how may resource elements are used to transmit a control signal.

According to a sixth variant provided in addition to any of the first to fifth variants, the control region of a partial or full subframe starting at the first starting position is larger in the time domain than the control region of a partial subframe starting at one of the remaining starting positions. Optionally, the control region of a partial subframe starting at one of the remaining starting position spans one Orthogonal Frequency-Division Multiplexing, OFDM, symbol.

According to a seventh variant provided in addition to any of the first to sixth variants, the user equipment is either configured to perform or not perform blind decoding for partial subframes. In case the user equipment is configured to not perform blind decoding for partial subframes, the user equipment performs for each subframe the step of blind decoding only for the first starting position of that subframe. On the other hand, in case the user equipment is configured to perform blind decoding for partial subframes, the user equipment performs for each subframe the step of blind decoding for each of the plurality of starting positions of that subframe. Optionally, the first set of control signal candidates is to be blind decoded by the user equipment at the first starting position when being configured to not perform blind decoding for partial subframes. Conversely, a second set of control signal candidates, different from the first set, is to be blind decoded by the user equipment at the first starting position when being configured to perform blind decoding for partial subframes. Further optionally, the number of control signal candidates of a set, preconfigured for a first starting position of a subframe to be blind decoded by the user equipment when being configured to not perform blind decoding for partial subframes, is the same as the number of control signal candidates of the sets preconfigured for all of the plurality of starting positions defined for a subframe to be blind decoded by the user equipment when being configured to perform blind decoding for partial subframes. According to one option, the user equipment is configured to perform or not perform blind decoding for partial subframes via higher-layer signaling, such as radio resource control signaling.

According to an $8^{th}$ variant provided in addition to any of the first to seventh variants, the control region is at the beginning of each of the partial and full subframes. The control region comprises a Physical Downlink Control Channel, PDCCH, a Physical Control Format Indicator Channel, PCFICH, and/or a Physical hybrid HARQ Indicator Channel, PHICH. Alternatively, the control region is distributed in the time domain over a data region of each of the partial and full subframes. The control region comprises an Enhanced PDCCH, and a second control region is at the beginning of each of the partial and full subframes. The second control region comprises a Physical Control Format Indicator Channel, PCFICH and/or a Physical hybrid HARQ Indicator Channel, PHICH.

According to a $9^{th}$ variant provided in addition to any of the first to $8^{th}$ variants, a subframe timing is used by the radio base station for the radio cell, the subframe timing defining subframe boundaries and slot boundaries in the time domain. Optionally, the subframe timing applies to the at least one unlicensed cell and to the at least one licensed cell. Alternatively, or additionally, the control signal includes control information for successfully decoding data transmitted in a data region of the subframe. The partial subframe ends at one of a plurality of end positions between the two subsequent subframe boundaries, a first end position being the second of the two subsequent subframe boundaries.

According to a $10^{th}$ variant provided in addition to any of the first to $9^{th}$ variants, data is mapped by the radio base station to the control region and a data region of the subframe, except to those resources of the control region which are used to transmit the one or more control signals. Consequently, the user equipment will decode the data from resources of the subframe except for the successfully decoded control signal candidate.

According to an $11^{th}$ variant, a user equipment is provided for blind decoding control signal candidates that are preconfigured by a radio base station for the user equipment in a control region of each subframe of a radio cell in a mobile communication system so as to be usable by the radio base station to transmit one or more control signals to the user equipment. A plurality of starting positions are preconfigured between two subsequent subframe boundaries, a first starting position being the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The user equipment comprises means configured to blind decode for each subframe, for at least the first starting position out of the plurality of starting positions, the set of control signal candidates preconfigured for that starting position so as to receive the one or more control signals for the subframe.

According to a 12$^{th}$ variant provided in addition to the 11$^{th}$ variant, the user equipment is configured with at least one licensed cell and at least one unlicensed cell. The radio cell is one of the at least one unlicensed cell such that the means perform the blind decoding for a subframe of the at least one unlicensed cell.

According to a 13$^{th}$ variant provided in addition to the 11$^{th}$ or 12$^{th}$ variant, the sets of control signal candidates are preconfigured such that the number of control signal candidates to be blind decoded by the user equipment at any one of the remaining starting positions is less than the number of control signal candidates to be blind decoded by the user equipment at the first starting position. Optionally, the sets of control signal candidates are preconfigured such that the number of control signal candidates of a set gets less with each next starting position, the number of control signal candidates preconfigured for the first starting position being higher than the number of control signal candidates preconfigured for the next starting position.

According to a 14$^{th}$ variant provided in addition to one of the 11$^{th}$ to 13$^{th}$ variants, the means for blind decoding are configured to continue blind decoding the sets of control signal candidates for each subframe either 1) until the one or more control signals are successfully decoded, or 2) for all starting positions irrespective of whether or not the one or more control signals are successfully decoded.

According to a 15$^{th}$ variant provided in addition to one of the 11$^{th}$ to 14$^{th}$ variants, the number of control signal candidates for a set of control signal candidates depends on a number of aggregation levels preconfigured for that set and on a number of control signal candidates per aggregation level preconfigured for that set. The number of aggregation levels preconfigured for the at least one further set is less than the number of aggregation levels preconfigured for the first set. Alternatively or additionally, the number of control signal candidates of at least one aggregation level of the at least one further set is less than the number of control signal candidates of the corresponding aggregation level of the first set. The aggregation level defines how may resource elements are used to transmit a control signal.

According to a 16$^{th}$ variant provided in addition to one of the 11$^{th}$ to 15$^{th}$ variants, the control region of a partial or full subframe starting at the first starting position is larger in the time domain than the control region of a partial subframe starting at one of the remaining starting positions. In one option, the control region of a partial subframe starting at one of the remaining starting position spans one Orthogonal Frequency-Division Multiplexing, OFDM, symbol.

According to a 17$^{th}$ variant provided in addition to one of the 11$^{th}$ to 16$^{th}$ variants, the user equipment is either configured to perform or not perform blind decoding for partial subframes. In case the user equipment is configured to not perform blind decoding for partial subframes, the means for blind decoding perform for each subframe the blind decoding only for the first starting position of that subframe. On the other hand, in case the user equipment is configured to perform blind decoding for partial subframes, the means for blind decoding perform for each subframe the blind decoding for each of the plurality of starting positions of that subframe. Optionally, the first set of control signal candidates is to be blind decoded by the user equipment at the first starting position when being configured to not perform blind decoding for partial subframes, and a second set of control signal candidates, different from the first set, is to be blind decoded by the user equipment at the first starting position when being configured to perform blind decoding for partial subframes. Optionally, the number of control signal candidates of a set, preconfigured for a first starting position of a subframe to be blind decoded by the user equipment when being configured to not perform blind decoding for partial subframes, is the same as the number of control signal candidates of the sets preconfigured for all of the plurality of starting positions defined for a subframe to be blind decoded by the user equipment when being configured to perform blind decoding for partial subframes. Optionally, the user equipment is configured to perform or not perform blind decoding for partial subframes via higher-layer signaling, such as radio resource control signaling.

According to a 18$^{th}$ variant, provided in addition to one of the 11$^{th}$ to 17$^{th}$ variants, data is mapped by the radio base station to the control region and a data region of the subframe, except to those resources of the control region which are used to transmit the one or more control signals. The user equipment decodes the data from resources of the subframe except for the successfully decoded control signal candidate.

According to a 19$^{th}$ variant, a radio base station is provided for transmitting one of more control signals to a user equipment, wherein control signal candidates are preconfigured by the radio base station for the user equipment so as to usable by the radio base station to transmit the one or more control signals to the user equipment. A plurality of starting positions are preconfigured between two subsequent subframe boundaries, a first starting position being the first subframe boundary of the two subsequent subframe boundaries. The subframe is either a partial subframe, not starting or not ending at subframe boundaries, or a full subframe, starting and ending at subframe boundaries. A full subframe starts at the first starting position, and a partial subframe starts at any one of the plurality of starting positions. A first set of control signal candidates is preconfigured for the user equipment for the first starting position. Further sets of control signal candidates are preconfigured for the user equipment for the remaining starting positions, one set of control signal candidates for each of the remaining starting positions. One control signal destined to the user equipment can be transmitted by the radio base station in one control signal candidate. The number of control signal candidates of at least one of the further sets is less than the number of control signal candidates of the first set. The radio base station comprises a processor configured to determine one of the plurality of starting positions to start the transmission of data. The processor is further configured to determine one control signal candidate from the set of control signal candidates preconfigured for the determined starting position. A transmitter is configured to transmit the control signal using the determined control signal candidate of the determined starting position.

According to a 20th variant, provided in addition to the 19th variant, the sets of control signal candidates are preconfigured such that the number of control signal candidates to be blind decoded by the user equipment at any one of the remaining starting positions is less than the number of control signal candidates to be blind decoded by the user equipment at the first starting position. Optionally, the sets of control signal candidates are preconfigured such that the number of control signal candidates of a set gets less with each next starting position, the number of control signal candidates preconfigured for the first starting position being higher than the number of control signal candidates preconfigured for the next starting position.

According to a 21st variant, provided in addition to the 19th or 20th variant, the number of control signal candidates for a set of control signal candidates depends on a number of aggregation levels preconfigured for that set and on a number of control signal candidates per aggregation level preconfigured for that set. The number of aggregation levels preconfigured for the at least one further set is less than the number of aggregation levels preconfigured for the first set. In addition or alternatively, the number of control signal candidates of at least one aggregation level of the at least one further set is less than the number of control signal candidates of the corresponding aggregation level of the first set. The aggregation level defines how may resource elements are used to transmit a control signal.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for blind decoding control signal candidates that are preconfigured by a radio base station for a user equipment in control regions of subframes of a radio cell in a mobile communication system so as to be usable by the radio base station to transmit one or more control signals to the user equipment, the method comprising the following steps performed by the user equipment for each of the subframes:

for at least a first starting position of a plurality of starting positions, blind decoding control signal candidates so as to receive the one or more control signals; and determining, using the one or more control signals, resources that are used to transmit data, wherein each of the subframes is either a partial subframe, not starting or not ending at full subframe boundaries, or a full subframe, starting and ending at full subframe boundaries, wherein the full subframe starts at the first starting position, and the partial subframe starts at any one of the remaining starting positions of the plurality of starting positions, wherein the plurality of starting positions are preconfigured between two consecutive full subframe boundaries, the first starting position being at a first full subframe boundary of the two consecutive full subframe boundaries, wherein a first set of control signal candidates is preconfigured for the user equipment to be positioned at the first starting position, wherein additional sets of control signal candidates are preconfigured for the user equipment to be positioned at the remaining starting positions, wherein each of the additional sets of control signal candidates is positioned at a respective starting position of the remaining starting positions, wherein one control signal destined to the user equipment can be transmitted by the radio base station in one control signal candidate, wherein the first set of control signal candidates includes a first number of control signal candidates, wherein at least one set of the additional sets of control signal candidates includes a second number of control signal candidates that is less than the first number of control signal candidates.

2. The method according to claim 1, wherein the user equipment is configured with at least one licensed cell and at least one unlicensed cell, and the radio cell is one of the at least one unlicensed cell such that the blind decoding is performed by the user equipment for a subframe of the at least one unlicensed cell.

3. The method according to claim 1, wherein the first set of control signal candidates and the additional sets of control signal candidates are preconfigured such that a number of control signal candidates of a set gets less with each next starting position.

4. The method according to claim 1, wherein the blind decoding is performed for each of the subframes either:
  until the one or more control signals are successfully decoded, or
  for all of the plurality of starting positions irrespective of whether or not the one or more control signals are successfully decoded.

5. The method according to claim 1, wherein the number of control signal candidates for a set of control signal candidates depends on a number of aggregation levels preconfigured for that set and on a number of control signal candidates per aggregation level preconfigured for that set,
  wherein a number of aggregation levels preconfigured for the at least one set of the additional sets is less than a number of aggregation levels preconfigured for the first set, or wherein a number of control signal candidates of at least one aggregation level of the at least one set of the additional sets is less than a number of control signal candidates of a corresponding aggregation level of the first set, and
  wherein the aggregation levels defines how may resource elements are used to transmit a control signal.

6. The method according to claim 1, wherein a control region of a partial or full subframe starting at the first starting position is larger in the time domain than a control region of a partial subframe starting at one of the remaining starting positions, wherein the control region of the partial subframe starting at one of the remaining starting position spans one Orthogonal Frequency-Division Multiplexing, OFDM, symbol.

7. The method according to claim 1, wherein the user equipment is either configured to perform or not perform blind decoding for partial subframes,
  wherein in case the user equipment is configured to not perform blind decoding for partial subframes, the user equipment performs, for each of the subframes, the blind decoding only for the first starting position of that subframe,
  wherein in case the user equipment is configured to perform blind decoding for partial subframes, the user equipment performs, for each of the subframes, the blind decoding for each of the plurality of starting positions of that subframe,
  wherein the first set of control signal candidates is to be blind decoded by the user equipment at the first starting position when being configured to not perform blind decoding for partial subframes, and a second set of control signal candidates, different from the first set, is to be blind decoded by the user equipment at the first starting position when being configured to perform blind decoding for partial subframes,
  wherein a number of control signal candidates of a set, preconfigured for a first starting position of a subframe to be blind decoded by the user equipment when being configured to not perform blind decoding for partial subframes, is the same as a number of control signal candidates of the sets preconfigured for all of the plurality of starting positions defined for a subframe to be blind decoded by the user equipment when being configured to perform blind decoding for partial subframes,
  wherein the user equipment is configured to perform or not perform blind decoding for partial subframes via higher-layer signaling.

8. The method according to claim 1, wherein each of the control regions is at the beginning of each of the partial and full subframes, wherein each of the control regions includes a Physical Downlink Control Channel, PDCCH, a Physical Control Format Indicator Channel, PCFICH, or a Physical hybrid HARQ Indicator Channel, PHICH, or
  wherein the control regions are distributed in the time domain over a data region of each of the partial and full subframes, wherein each of the control regions includes an Enhanced PDCCH, and a second control region is at the beginning of each of the partial and full subframes, wherein the second control region includes a Physical Control Format Indicator Channel, PCFICH or a Physical hybrid HARQ Indicator Channel, PHICH.

9. The method according to claim 1, wherein a subframe timing is used by the radio base station for the radio cell, the subframe timing defining full subframe boundaries and slot boundaries in the time domain, wherein the subframe timing applies to at least one unlicensed cell and to at least one licensed cell, or
  wherein the one or more control signals includes control information for successfully decoding data transmitted in a data region of a subframe, or
  the partial subframe ends at one of a plurality of end positions between the two consecutive full subframe boundaries, a first end position being a second full subframe boundary of the two consecutive full subframe boundaries.

10. The method according to claim 1, wherein data is mapped by the radio base station to the control region and a data region of each of the subframes, except to those resources of the control region which are used to transmit the one or more control signals, such that the user equipment will decode the data from resources of each of the subframes except for a successfully decoded control signal candidate.

11. A user equipment for blind decoding control signal candidates that are preconfigured by a radio base station for the user equipment in control regions of subframes of a radio cell in a mobile communication system so as to be usable by the radio base station to transmit one or more control signals to the user equipment, the user equipment comprising:
  circuitry, which, in operation, blind decodes, for each of the subframes and for at least a first starting position out of a plurality of starting positions, control signal candidates so as to receive the one or more control signals; and
  circuitry, which, in operation, determines, using the one or more control signals, resources that are used to transmit data,
    wherein each of the subframes is either a partial subframe, not starting or not ending at full subframe boundaries, or a full subframe, starting and ending at full subframe boundaries, wherein the full subframe starts at the first starting position, and the partial subframe starts at any one of the remaining starting positions of the plurality of starting positions, wherein the plurality of starting positions are preconfigured between two consecutive full subframe boundaries, the first starting position being at a first full subframe boundary of the two consecutive full subframe boundaries, wherein a first set of control signal candidates is preconfigured for the user equipment to be positioned at the first starting position, wherein additional sets of control signal candidates are preconfigured for the user equipment to be positioned at the remaining starting positions, wherein each of the additional sets of control signal candidates is positioned at a respective starting position of the remaining starting positions, wherein one control signal destined to the user equipment can be transmitted by the radio base station in one control signal candidate, wherein the first set of control signal candidates includes a first number of control signal candidates, wherein at least one set of the additional sets of control signal candidates includes a second number of control signal candidates that is less than the first number of control signal candidates.

12. The user equipment according to claim 11, wherein the user equipment is configured with at least one licensed cell and at least one unlicensed cell, and the radio cell is one of the at least one unlicensed cell such that the circuitry, in operation, blind decodes for a subframe of the at least one unlicensed cell.

13. The user equipment according to claim 11, wherein the first set of control signal candidates and the additional sets of control signal candidates are preconfigured such that a number of control signal candidates of a set gets less with each next starting position.

14. The user equipment according to claim 11, wherein the circuitry, in operation, continues to blind decode the control signal candidates either:
until the one or more control signals are successfully decoded, or
for all of the plurality of starting positions irrespective of whether or not the one or more control signals are successfully decoded.

15. The user equipment according to claim 11, wherein the number of control signal candidates for a set of control signal candidates depends on a number of aggregation levels preconfigured for that set and on a number of control signal candidates per aggregation level preconfigured for that set,
wherein a number of aggregation levels preconfigured for the at least one set of the additional sets less than a number of aggregation levels preconfigured for the first set, or wherein a number of control signal candidates of at least one aggregation level of the at least one set of the additional sets is less than a number of control signal candidates of a corresponding aggregation level of the first set, and
wherein the aggregation levels defines how may resource elements are used to transmit a control signal.

16. The user equipment according to claim 11, wherein a control region of a partial or full subframe starting at the first starting position is larger in the time domain than a control region of a partial subframe starting at one of the remaining starting positions, wherein the control region of the partial subframe starting at one of the remaining starting position spans one Orthogonal Frequency-Division Multiplexing, OFDM, symbol.

17. The user equipment according to claim 11, wherein the user equipment is either configured to perform or not perform blind decoding for partial subframes,
wherein in case the user equipment is configured to not perform blind decoding for partial subframes, the circuitry, in operation, blind decodes, for each of the subframes, only for the first starting position of that subframe,
wherein in case the user equipment is configured to perform blind decoding for partial subframes, the circuitry, in operation, blind decodes, for each of the subframes, for each of the plurality of starting positions of that subframe,
wherein the first set of control signal candidates is to be blind decoded by the user equipment at the first starting position when being configured to not perform blind decoding for partial subframes, and a second set of control signal candidates, different from the first set, is to be blind decoded by the user equipment at the first starting position when being configured to perform blind decoding for partial subframes,
wherein a number of control signal candidates of a set, preconfigured for a first starting position of a subframe to be blind decoded by the user equipment when being configured to not perform blind decoding for partial subframes, is the same as a number of control signal candidates of the sets preconfigured for all of the plurality of starting positions defined for a subframe to be blind decoded by the user equipment when being configured to perform blind decoding for partial subframes,
wherein the user equipment is configured to perform or not perform blind decoding for partial subframes via higher-layer signaling.

18. The user equipment according to claim 11, wherein data is mapped by the radio base station to the control region and a data region of each of the subframes, except to those resources of the control region which are used to transmit the one or more control signals,
wherein the user equipment decodes the data from resources of each of the subframes except for a successfully decoded control signal candidate.

19. A radio base station for transmitting, to a user equipment, one of more control signals using control signal candidates that are preconfigured by the radio base station for the user equipment in control regions of subframes of a radio cell in a mobile communication system so as to usable by the radio base station to transmit the one or more control signals to the user equipment, the radio base station comprising:
a processor, which, in operation, determines one of a plurality of starting positions to start transmission of data, and determines a control signal candidate from a set of control signal candidates; and
a transmitter, which, in operation, transmits the one or more control signals using the determined control signal candidate,
wherein each of the subframes is either a partial subframe, not starting or not ending at full subframe boundaries, or a full subframe, starting and ending at full subframe boundaries, wherein the full subframe starts at a first starting position of the plurality of starting positions, and the partial subframe starts at any one of the remaining starting positions of the plurality of starting positions, wherein the plurality of starting positions are preconfigured between two consecutive full subframe boundaries, the first starting position being at a first full subframe boundary of the two consecutive full subframe boundaries, wherein a first set of control signal candidates is preconfigured for the user equipment to be positioned at the first starting position, wherein additional sets of control signal candidates are preconfigured for the user equipment to be positioned at the remaining starting positions, wherein each of the additional sets of control signal candidates is positioned at a respective starting position of the remaining starting positions, wherein one control signal destined to the user equipment can be transmitted by the radio base station in one control signal candidate, wherein the first set of control signal candidates includes a first number of control signal candidates, wherein at least one set of the additional sets of control signal candidates includes a second number of control signal candidates that is less than the first number of control signal candidates.

20. The radio base station according to claim 19, wherein the first set of control signal candidates and the additional sets of control signal candidates are preconfigured such that a number of control signal candidates of a set gets less with each next starting position.

* * * * *